(12) United States Patent
Liu et al.

(10) Patent No.: US 12,725,005 B2
(45) Date of Patent: Sep. 1, 2026

(54) SYSTEMS AND METHODS FOR FEW-SHOT NETWORK ANOMALY DETECTION VIA CROSS-NETWORK META-LEARNING

(71) Applicants: Huan Liu, Tempe, AZ (US); Kaize Ding, Tempe, AZ (US)

(72) Inventors: Huan Liu, Tempe, AZ (US); Kaize Ding, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 999 days.

(21) Appl. No.: 17/819,446

(22) Filed: Aug. 12, 2022

(65) Prior Publication Data

US 2023/0089481 A1 Mar. 23, 2023

Related U.S. Application Data

(60) Provisional application No. 63/232,789, filed on Aug. 13, 2021.

(51) Int. Cl.
*G06N 3/04* (2023.01)
*G06F 18/214* (2023.01)

(52) U.S. Cl.
CPC ............. *G06N 3/04* (2013.01); *G06F 18/214* (2023.01)

(58) Field of Classification Search
CPC ................................ G06N 3/04; G06F 18/214
See application file for complete search history.

(56) References Cited

U.S. PATENT DOCUMENTS

2014/0096249 A1* 4/2014 Dupont .................. G06F 21/00 726/23

OTHER PUBLICATIONS

Leman Akoglu, Hanghang Tong, and Danai Koutra. 2015. Graph based anomaly detection and description: a survey. DMKD (2015).
Sambaran Bandyopadhyay, N Lokesh, and M Narasimha Murty. 2019. Outlier aware network embedding for attributed networks. In AAAI.
Markus M Breunig, Hans-Peter Kriegel, Raymond T Ng, and Jorg Sander. 2000. LOF: identifying density-based local outliers. In SIGMOD.
Shaosheng Cao, Wei Lu, and Qiongkai Xu. 2016. Deep neural networks for learning graph representations. In AAAI.
Kaize Ding, Jundong Li, Nitin Agarwal, and Huan Liu. 2020. Inductive anomaly detection on attributed networks. In IJCAI.

(Continued)

*Primary Examiner* — Ann J Lo
(74) *Attorney, Agent, or Firm* — Polsinelli PC

(57) ABSTRACT

Various embodiments for few-shot network anomaly detection via cross-network meta-learning are disclosed herein. An anomaly detection system incorporating a new family of graph neural networks—Graph Deviation Networks (GDN) can leverage a small number of labeled anomalies for enforcing statistically significant deviations between abnormal and normal nodes on a network. Further, the GDN is equipped with a new cross-network meta-learning algorithm (Meta-GDN) to realize few-shot network anomaly detection by transferring meta-knowledge from multiple auxiliary networks. Extensive evaluations demonstrate the efficacy of the anomaly detection system and the Meta-GDN on few-shot or even one-shot network anomaly detection.

19 Claims, 11 Drawing Sheets

(56) References Cited

OTHER PUBLICATIONS

Ding, K., Ia, J., Bhanushali, R., and Liu, H. Deep anomaly detection on attributed networks. In Proceedings of the SIAM International Conference on Data Mining (2019).
Ding, K., Li, J., and Liu, H. Interactive anomaly detection on attributed networks. In Proceedings of the ACM International Conference on Web Search and Data Mining (2019).
Kaize Ding, Jianling Wang, Jundong Li, Kai Shu, Chenghao Liu, and Huan Liu. 2020. Graph prototypical networks for few-shot learning on attributed networks. In CIKM.
Yingtong Dou, Zhiwei Liu, Li Sun, Yutong Deng, Hao Peng, and Philip S Yu. 2020. Enhancing graph neural network- based fraud detectors against camouflaged fraudsters. In CIKM.
Chelsea Finn, Pieter Abbeel, and Sergey Levine. 2017. Model-agnostic meta-learning for fast adaptation of deep networks. ICML (2017).
Raia Hadsell, Sumit Chopra, and Yann LeCun. 2006. Dimensionality reduction by learning an invariant mapping. In CVPR.
Will Hamilton, Zhitao Ying, and Jure Leskovec. 2017. Inductive representation learning on large graphs. In NeurIPS.
Sepp Hochreiter, A Steven Younger, and Peter R Conwell. 2001. Learning to learn using gradient descent. In ICANN.
Thomas N. Kipf and Max Welling. 2017. Semi-Supervised Classification with Graph Convolutional Networks. In ICLR.
Hans-Peter Kriegel, Peer Kroger, Erich Schubert, and Arthur Zimek. 2011. Interpreting and unifying outlier scores. In SDM.
Ao Li, Zhou Qin, Runshi Liu, Yiqun Yang, and Dong Li. 2019. Spam review detection with graph convolutional networks. In CIKM.
Jundong Li, Harsh Dani, Xia Hu, and Huan Liu. 2017. Radar: Residual Analysis for Anomaly Detection in Attributed Networks.. In IJCAI.
Yuening Li, Xiao Huang, Jundong Li, Mengnan Du, and Na Zou. 2019. SpecAE: Spectral AutoEncoder for Anomaly Detection in Attributed Networks. In CIKM.
Lu Liu, Tianyi Zhou, Guodong Long, Jing Jiang, Xuanyi Dong, and Chengqi Zhang. 2021. Isometric Propagation Network for Generalized Zero-shot Learning. In ICLR.
Lu Liu, Tianyi Zhou, Guodong Long, Jing Jiang, Lina Yao, and Chengqi Zhang. 2019. Prototype propagation networks (PPN) for weakly-supervised few-shot learning on category graph. In NeurIPS.
Emmanuel Muller, Patricia Iglesias Sanchez, Yvonne Mulle, and Klemens Böhm. 2013. Ranking outlier nodes in subspaces of attributed graphs. In ICDE Workshop.
Guansong Pang, Chunhua Shen, and Anton van den Hengel. 2019. Deep anomaly detection with deviation networks. In KDD.
Shebuti Rayana and Leman Akoglu. 2015. Collective opinion spam detection: Bridging review networks and metadata. In KDD.
Lukas Ruff, Robert A Vandermeulen, Nico Gornitz, Alexander Binder, Emmanuel Muller, Klaus-Robert Muller, and Marius Kloft. 2020. Deep Semi-Supervised Anomaly Detection. In ICL=.
Patricia Iglesias Sanchez, Emmanuel Muller, Oretta Irmler, and Klemens B6hm. 2014. Local context selection for outlier ranking in graphs with multiple numeric node attributes. In SSDBM.
Adam Santoro, Sergey Bartunov, Matthew Botvinick, Daan Wierstra, and Timothy Lillicrap. 2016. Meta-learning with memory-augmented neural networks. In ICML.
Prithviraj Sen, Galileo Namata, Mustafa Bilgic, Lise Getoor, Brian Galligher, and Tina Eliassi-Rad. 2008. Collective classification in network data. AI magazine (2008).
Xiao Shen, Quanyu Dai, Fu-lai Chung, Wei Lu, and Kup-Sze Choi. 2020. Adversarial Deep Network Embedding for Cross-Network Node Classification.. In AAAI.
David B Skillicorn. 2007. Detecting anomalies in graphs. In ISI.
Xiuyao Song, Mingxi Wu, Christopher Jermaine, and Sanjay Ranka. 2007. Conditional anomaly detection. TKDE (2007).
Xianfeng Tang, Yandong Li, Yiwei Sun, Huaxiu Yao, Prasenjit Mitra, and Suhang Wang. 2020. Transferring Robustness for Graph Neural Network Against Poisoning Attacks. In WSDM.
Petar Velickovic, Guillem Cucurull, Arantxa Casanova, Adriana Romero, Pietro Lio, and Yoshua Bengio. 2018. Graph attention networks. In ICLR.
Oriol Vinyals, Charles Blundell, Timothy Lillicrap, Daan Wierstra, et al. 2016. Matching networks for one shot learning. In NeurIPS.
Daixin Wang, Jianbin Lin, Peng Cui, Quanhui Jia, Zhen Wang, Yanming Fang, Quan Yu, Jun Zhou, Shuang Yang, and Yuan Qi. 2019. A Semi-supervised Graph Attentive Network for Financial Fraud Detection. In ICDM.
Ning Wang, Minnan Luo, Kaize Ding, Lingling Zhang, Jundong Li, and Qinghua Zheng. 2020. Graph Few-shot Learning with Attribute Matching. In CIKM.
Keyulu Xu, Weihua Hu, Jure Leskovec, and Stefanie Jegelka. 2019. How powerful are graph neural networks?. In ICLR.
Xiaowei Xu, Nurcan Yuruk, Zhidan Feng, and Thomas AJ Schweiger. 2007. Scan: a structural clustering algorithm for networks. In Proceedings of the 13th ACM SIGKDD International Conference on Knowledge Discovery and Data mining (KDD).
Jiaxuan You, Bowen Liu, Zhitao Ying, Vijay Pande, and Jure Leskovec. 2018. Graph convolutional policy network for goal-directed molecular graph generation. In NeurIPS.
Yin Zhang, Rong Jin, and Zhi-Hua Zhou. 2010. Understanding bag-of-words model: a statistical framework. IJMLC (2010).
Zhen-Yu Zhang, Peng Zhao, Yuan Jiang, and Zhi-Hua Zhou. 2019. Learning from incomplete and inaccurate supervision. In KDD.
Tong Zhao, Chuchen Deng, Kaifeng Yu, Tianwen Jiang, Daheng Wang, and Meng Jiang. 2020. Error-Bounded Graph Anomaly Loss for GNNs. In CIKM.
Dawei Zhou, Jingrui He, Hongxia Yang, and Wei Fan. 2018. Sparc: Self-paced network representation for few-shot rare category characterization. In KDD.
Fan Zhou, Chengtai Cao, Goce Trajcevski, Kunpeng Zhang, Ting Zhong, and Ji Geng. 2020. Fast Network Alignment via Graph Meta-Learning. In INFOCOM.
Qinghai Zhou, Liangyue Li, Nan Cao, Lei Ying, and Hanghang Tong. 2019. ADMIRING: Adversarial multi-network mining. In ICDM.
Qinghai Zhou, Liangyue Li, and Hanghang Tong. 2019. Towards Real Time Team Optimization. In Big Data.
Daniel Zugner and Stephan Gunnemann. 2019. Adversarial Attacks on Graph Neural Networks via Meta Learning. In ICLR.
Borgwardt, K. M., Ong, C. S., Schonauer, S., Vishwanathan, S., Smola, A. J., and Kriegel, H.-P. Protein function prediction via graph kernels. Bioinformatics (2005).
Bose, A. J., Jain, A., Molino, P., and Hamilton, W. L. Meta-graph: Few shot link prediction via meta learning. arXiv preprint arXiv:1912.09867 (2019).
Bruna, J., Zaremba, W., Szlam, A., and Lecun, Y. Spectral networks and locally connected networks on graphs. arXiv preprint arXiv:1312.6203 (2013).
Chang, S., Han, W., Tang, J., Qi, G.-J., Aggarwal, C. C., and Huang, T. S. Heterogeneous network embedding via deep architectures. In Proceedings of the ACM SIGKDD International Conference on Knowledge Discovery and Data Mining (2015).
Defferrard, M., Bresson, X., and Vandergheynst, P. Convolutional neural networks on graphs with fast localized spectral filtering. In Proceedings of the International Conference on Neural Information Processing Systems (2016).
Deng, S., Zhang, N., Kang, J., Zhang, Y., Zhang, W., and Chen, H. Meta-learning with dynamic-memory-based prototypical network for few-shot event detection. In Proceedings of the International Conference on Web Search and Data Mining (2020).
Garcia, V., and Bruna, J. Few-shot learning with graph neural networks. Proceedings of the International Conference on Learning Representations (2018).
Garcia-Teodoro, P., Diaz-Verdejo, J., Macia-Fernandez, G., and Vazquez, E. Anomaly-based network intrusion detection: Techniques, systems and challenges. computers & security (2009).
Grover, A., and Leskovec, J. node2vec: Scalable feature learning for networks. In Proceedings of the ACM SIGKDD international conference on Knowledge discovery and data mining (2016).
Henaff, M., Bruna, J., and Lecun, Y. Deep convolutional networks on graph-structured data. arXiv preprint arXiv,1506.05163 (2015).

(56) References Cited

OTHER PUBLICATIONS

Koch, G., Zemel, R., and Salakhutdinov, R. Siamese neural networks for one-shot image recognition. In ICML deep learning workshop (2015).
Leskovec, J., and Mcauley, J. J. Learning to discover social circles in ego networks. In Proceedings of the Annual Conference on Neural Information Processing Systems (2012).
Li, Z., Zhou, F., Chen, F., and Li, H. Meta-sgd: Learning to learn quickly for few-shot learning. arXiv preprint arXiv:1707)09835 (2017).
Liu, L., Zhou, T., Long, G., Jiang, J., and Zhang, C. Learning to propagate for graph meta-learning. In Proceedings of the Annual Conference on Neural Information Processing Systems (2019).
Mcauley, J., Pandey, R., and Leskovec, J. Inferring networks of substitutable and complementary products. In Proceedings of the ACM SIGKDD International Conference on Knowledge Discovery and Data Mining (2015).
Mishra, N., Rohaninejad, M., Chen, X., and Abbeel, P. A simple neural attentive meta-learner. In Proceedings of the International Conference on Learning Representations (2018).
Page, L., Brin, S., Motwani, R., and Winograd, T. The pagerank citation ranking: Bringing order to the web. Tech. rep., Stanford InfoLab, 1999.
Park, N., Kan, A., Dong, X. L., Zhao, T., and Faloutsos, C. Estimating node importance in knowledge graphs using graph neural networks. In Proceedings of the ACM SIGKDD International Conference on Knowledge Discovery and Data Mining (2019).
Pennington, J., Socher, R., and Manning, C. D. Glove: Global vectors for word representation. In Proceedings of the Conference on Empirical Methods in Natural Language Processing (2014).
Perozzi, B., Al-Rfou, R., and Skiena, S. Deepwalk: Online learning of social representations. In Proceedings of the ACM SIGKDD international conference on Knowledge discovery and data mining (2014).
Qi, G.-J., Aggarwal, C., Tian, Q., Ji, H., and Huang, T. Exploring context and content links in social media: A latent space method. IEEE Transactions on Pattern Analysis and Machine Intelligence (2011).
Qiao, L., Shi, Y., Li, J., Wang, Y., Huang, T., and Tian, Y. Transductive episodic-wise adaptive metric for few-shot learning. In Proceedings of the IEEE International Conference on Computer Vision (2019).
Ravi, S., and Larochelle, H. Optimization as a model for few-shot learning. In Proceedings of the International Conference on Learning Representations (2017).
Ren, M., Triantafillou, E., Ravi, S., Snell, J., Swersky, K., Tenenbaum, J. B., Larochelle, H., and Zemel, R. S. Meta-learning for semi-supervised few-shot classification. In Proceedings of the International Conference on Learning Representations (2018).
Scarselli, F., Gori, M., Tsoi, A. C., Hagenbuchner, M., and Monfardini, G. The graph neural network model. IEEE Transactions on Neural Networks (2009).
Snell, J., Swersky, K., and Zemel, R. Prototypical networks for few-shot learning. In Proceedings of the Annual Conference on Neural Information Processing Systems (2017).
Subramanian, A., Tamayo, P., Mootha, V. K., Mukherjee, S., Ebert, B. L., Gillette, M. A., Paulovich, A., Pomeroy, S. L., Golub, T. R., Lander, E. S., et al. Gene set enrichment analysis: a knowledge-based approach for interpreting genome-wide expression profiles. Proceedings of the National Academy of Sciences (2005).
Sung, F., Yang, Y., Zhang, L., Xiang, T., Torr, P. H., and Hospedales, T. M. Learning to compare: Relation network for few-shot learning. In Proceedings of the IEEE Conference on Computer Vision and Pattern Recognition (2018).
Tang, J., Zhang, J., Yao, L., Li, J., Zhang, L., and Su, Z. Arnetminer: extraction and mining of academic social networks. In Proceedings of the ACM SIGKDD International Conference on Knowledge Discovery and Data Mining (2008).
Wang, J., Ding, K., Hong, L., Liu, H., and Caverlee, J. Next-item recommendation with sequential hypergraphs. In Proceedings of the International ACM SIGIR Conference on Research and Development in Information Retrieval (2020).
Yao, H., Zhang, C., Wei, Y., Jiang, M., Wang, S., Huang, J., Chawla, N. V., and Li, Z. Graph few-shot learning via knowledge transfer. In Proceedings of the AAAI Conference on Artificial Intelligence (2020).
Zhang, J., Zhao, C., Ni, B., Xu, M., and Yang, X. Variational few-shot learning. In Proceedings of the IEEE International Conference on Computer Vision (2019).
Zhang, T., and Wu, B. A method for local community detection by finding core nodes. In Proceedings of the International Conference on Advances in Social Networks Analysis and Mining (2012).
Zhou, F., Cao, C., Zhang, K., Trajcevski, G., Zhong, T., and Geng, J. Meta-gnn: On few-shot node classification in graph meta-learning. In Proceedings of the ACM International Conference on Information and Knowledge Management (2019).
Jie Tang, Jing Zhang, Limin Yao, Juanzi Li, Li Zhang, and Zhong Su. 2008. Arnet-miner: extraction and mining of academic social networks. In KDD.
Chong Zhou and Randy C Paffenroth. 2017. Anomaly detection with robust deep autoencoders. In KDD.
Velickovic, P., Cucurull, G., Casanova, A., Romero, A., Lio, P., and Bengio, Y. Graph attention networks. In Proceedings of the International Conference on Learning Representations (2018).
Hanghang Tong and Ching-Yung Lin. 2011. Non-negative residual matrix factorization with application to graph anomaly detection. In SDM.
Christopher D Manning, Hinrich Schutze, and Prabhakar Raghavan. 2008. Introduction to information retrieval. Cambridge University Press.
Reza Zafarani, Mohammad Ali Abbasi, and Huan Liu. 2014. Social media mining: an introduction. Cambridge University Press.
Northcutt, S., and Novak, J. Network intrusion detection. Sams Publishing, 2002.
Kleinbaum, D. G., Dietz, K., Gail, M., Klein, M., and Klein, M. Logistic regression. Springer, 2002.

* cited by examiner (a) Latent Representation Space (b) Anomaly Score Space

SYSTEMS AND METHODS FOR FEW-SHOT NETWORK ANOMALY DETECTION VIA CROSS-NETWORK META-LEARNING

CROSS-REFERENCE TO RELATED APPLICATIONS

This is a non-provisional patent application that claims benefit to U.S. Provisional Patent Application Ser. No. 63/232,789 filed 13 Aug. 2021, which is herein incorporated by reference in its entirety.

GOVERNMENT SUPPORT

This invention was made with government support under grant 1614576 awarded by the National Science Foundation. The government has certain rights in the invention.

FIELD

The present disclosure generally relates few-shot anomaly detection, and particularly to systems and methods for few-shot network anomaly detection via cross-network meta-learning.

BACKGROUND

Network-structured data, ranging from social networks to team collaboration networks, from citation networks to molecular graphs, has been widely used in modeling a myriad of real-world systems. Nonetheless, real-world networks are commonly contaminated with a small portion of nodes; namely, anomalies whose patterns significantly deviate from the vast majority of nodes. For instance, in a citation network that represents citation relations between papers, there are some research papers with a few spurious references (i.e., edges). In a social network that represents friendship of users, there may exist camouflaged users who randomly follow different users, rendering properties like homophily not applicable to this type of relationships. As the existence of even few abnormal instances could cause extremely detrimental effects, the problem of network anomaly detection has received much attention in industry and academy alike.

Because labeling anomalies are highly labor-intensive and takes specialized domain-knowledge, existing methods are predominately developed in an unsupervised manner. As a prevailing paradigm, people try to measure the abnormality of nodes with the reconstruction errors of autoencoder-based models or the residuals of matrix factorization-based methods. However, the anomalies they identify may turn out to be data noises or uninteresting data instances due to the lack of prior knowledge on the anomalies of interest. A potential solution to this problem is to leverage limited or few labeled anomalies as the prior knowledge to learn anomaly-informed models, since it is relatively low-cost in real-world scenarios—a small set of labeled anomalies could be either from a deployed detection system or be provided by user feedback. In the meantime, such valuable knowledge is usually scattered among other networks within the same domain of the target one, which could be further exploited for distilling supervised signal. For example, LinkedIn and Indeed have similar social networks that represent user friendship in the job-search domain; ACM and DBLP can be treated as citation networks that share similar citation relations in the computer science domain. According to previous studies, because of the similarity of topological structure and nodal attributes, it is feasible to transfer valuable knowledge from source network(s) to the target network so that the performance on the target one is elevated.

Nonetheless, solving this under-explored problem remains nontrivial, mainly owing to the following reasons: (1) From the micro (intra-network) view, since we only have limited knowledge of anomalies, it is hard to precisely characterize the abnormal patterns. If we directly adopt existing semi-supervised or PU learning techniques, those methods often fall short in achieving satisfactory results as they might still require a relatively large percentage of positive examples. To handle such an incomplete supervision challenge as illustrated in FIG. 1A instead of focusing on abnormal nodes, conventional thought focuses on how to leverage labeled anomalies as few as possible to learn a high-level abstraction of normal patterns is necessary to be explored. (2) From the macro (inter-network) view, though networks in the same domain might share similar characteristics in general, anomalies exist in different networks may be from very different manifolds. Previous studies on cross-network learning mostly focus on transferring the knowledge only from a single network, which may cause unstable results and the risk of negative transfer. As learning from multiple networks could provide more comprehensive knowledge about the characteristics of anomalies, a cross-network learning algorithm that is capable of adapting such knowledge is highly desirable.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
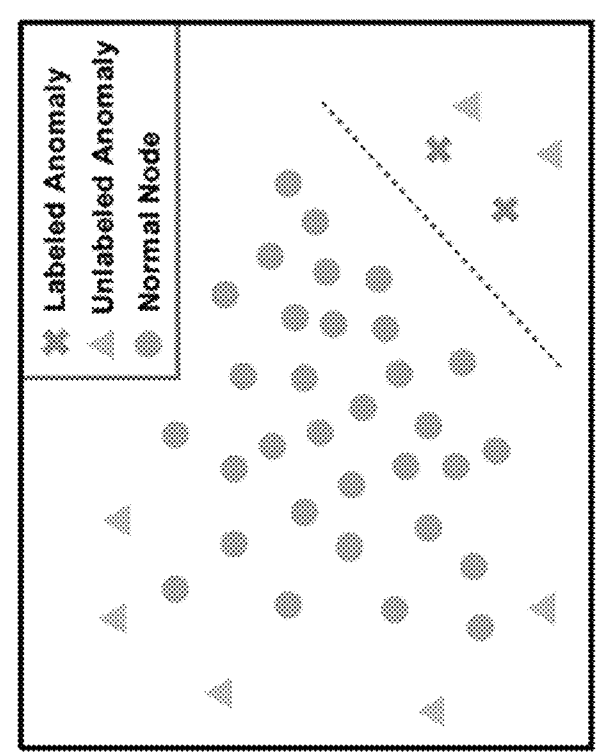
FIG. 1A is an illustration of a latent representation space.
Figure 1B:
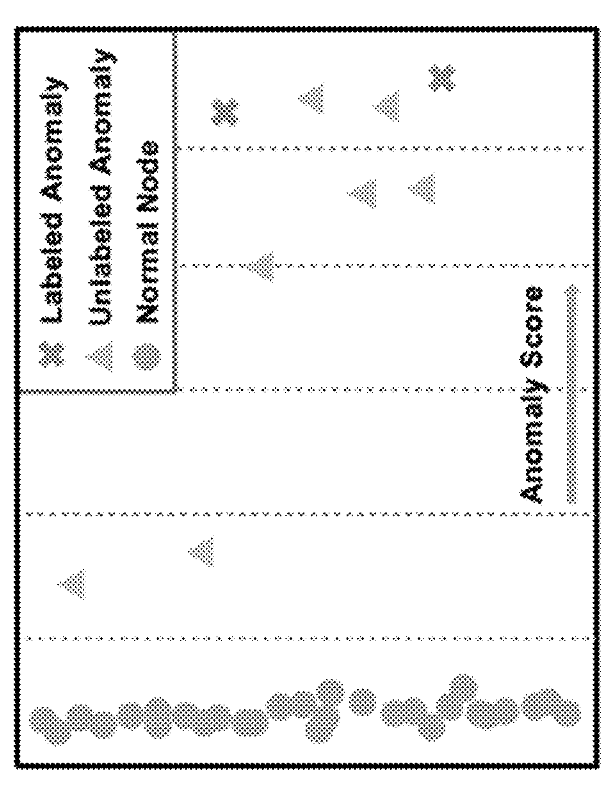
FIG. 1B is an illustration showing an anomaly score space.

Various embodiments for a new family of graph neural networks—referred to herein as Graph Deviation Networks (GDN)— are disclosed herein that leverage a small number of labeled anomalies for enforcing statistically significant deviations between abnormal and normal nodes on a network. The GDN is equipped with a new cross-network meta-learning algorithm to realize few-shot network anomaly detection by transferring metaknowledge from multiple auxiliary networks. As such, the GDN enables network anomaly detection with limited labeled data. Specifically, given an arbitrary network, the GDN first uses a GNN-backboned anomaly score learner to assign each node with an anomaly score, and then defines a mean of the anomaly scores based on a prior probability to serve as a reference score for guiding subsequent anomaly score learning tasks. By leveraging a deviation loss, the GDN is able to enforce statistically significant deviations of the anomaly scores of anomalies from that of normal nodes in the anomaly score space (as shown in FIG. 1B). To further transfer this ability from multiple networks to the target one, a cross-network meta-learning algorithm to learn a well-generalized initialization of GDN from multiple few-shot network anomaly detection tasks is disclosed herein. Further, the present disclosure provides an integrated framework (Meta-GDN) that extracts comprehensive meta-knowledge for detecting anomalies across multiple auxiliary networks, which largely alleviates the limitations of transferring from a single network and enables the GDN to adapt to different anomaly detection tasks by essentially teaching the GDN how to generalize the anomaly detection task through exposure to multiple auxiliary networks. Subsequently, the initialization can be easily adapted to a target network via fine-tuning with few or even one labeled anomaly, thereby improving the anomaly detection performance on the target network to a large extent.

Network Anomaly Detection

Network anomaly detection methods have a specific focus on the network structured data. Previous research mostly focuses on the problem of anomaly detection on plain networks. As network structure is oftentimes the only available information modality in a plain network, this category of anomaly detection methods tries to exploit the network structure information to spot anomalies from different perspectives. For instance, SCAN is one of the first methods that target to find structural anomalies in networks. In recent days, attributed networks have been widely used to model a wide range of complex systems due to their superior capacity for handling data heterogeneity. In addition to the observed node-to-node interactions, attributed networks also encode a rich set of features for each node. Therefore, anomaly detection on attributed networks have drawn increasing research attention in the community, and various methods have been proposed. Among them, ConOut identifies the local context for each node and performs anomaly ranking within the local context. More recently, researchers have proposed solving the problem of network anomaly detection using graph neural networks due to its strong modeling power. DOMINANT achieves superior performance over other shallow methods by building a deep autoencoder architecture on top of the graph convolutional networks. Semi-GNN is a semi-supervised graph neural model which adopts hierarchical attention to model the multi-view graph for fraud detection. GAS is a GCN-based large-scale anti-spam method for detecting spam advertisements. A novel loss function to train GNNs for anomaly-detectable node representations has been previously proposed. Apart from the known methodologies, the present system focuses on detecting anomalies on a target network with fewer labels by learning from multiple auxiliary networks.

Graph Neural Networks

Graph neural networks have achieved groundbreaking success in transforming the information of a graph into lowdimensional latent representations. Originally inspired by graph spectral theory, spectral-based graph convolutional networks (GCNs) have emerged and demonstrated their efficacy by designing different graph convolutional layers. Among them, the model proposed by Kipf et al. has become the most prevailing one by using a linear filter. In addition to spectral-based graph convolution models, spatial-based graph neural networks that follow neighborhoods aggregation schemes also have been extensively investigated. Instead of training individual embeddings for each node, those methods learn a set of aggregator functions to aggregate features from a node's local neighborhood. GraphSAGE learns an embedding function that can be generalized to unseen nodes, which enables inductive representation learning on network-structured data. Similarly, Graph Attention Networks (GATs) learn hidden representations by introducing a self-attention strategy when aggregating neighborhood information of a node. Furthermore, Graph Isomorphism Network (GIN) extends the idea of parameterizing universal multiset functions with neural networks and has proven to be as theoretically powerful as the Weisfeiler-Lehman (WL) graph isomorphism test. To go beyond a single graph and transfer the knowledge across multiple ones, more recently, researchers have explored to integrate GNNs with meta-learning techniques. For instance, PA-GNN transfers the robustness from cleaned graphs to the target graph via meta-optimization. Meta-NA is a graph alignment model that learns a unified metric space across multiple graphs, where one can easily link entities across different graphs; however, those efforts cannot be applied to the present problem.

Problem Definition

In this section, the problem of few-shot cross-network anomaly detection is defined. Throughout the present disclosure, bold uppercase letters is used for matrices (e.g., A), bold lowercase letters for vectors (e.g., u), lowercase letters for scalars (e.g., s) and calligraphic fonts to denote sets (e.g. $\mathcal{V}$,). Notably, in the present disclosure the attributed network is focused on for a more general purpose. Given an attributed network $G=(\mathcal{V}, \mathcal{E}, X)$ where $\mathcal{V}$ is the set of nodes, i.e., $\{v_1, v_2, \ldots, v_n\}$, $\mathcal{E}$ denotes the set of edges, i.e., $\{e_1, e_2, \ldots, e_m\}$. The node attributes are represented by $$X = [x_1^T, x_2^T, \ldots, x_n^T] \in \mathbb{R}^{n \times d}$$

and $x_i$ is the attribute vector for node $v_i$. More concretely, the attributed network can be represented as $G=(A,X)$, where $A=\{0,1\}^{n \times n}$ is an adjacency matrix representing the network structure. Specifically, $A_{i,j}=1$ indicates that there is an edge between node v and node $v_i$, otherwise, $A_{i,j}=0$.

Generally speaking, few-shot cross-network anomaly detection aims to maximally improve the detection performance on the target network by transferring very limited supervised knowledge of ground-truth anomalies from the auxiliary network(s). In addition to the target network $G^t$, in the present disclosure it is assumed there exists P auxiliary networks $$\mathcal{G}^s = \{G_1^s, G_2^s, \ldots, G_P^s\}$$

sharing the same or similar domain with $G^t$. For an attributed network, the set of labeled abnormal nodes is denoted as $\mathcal{V}^L$ and the set of unlabeled nodes is represented as $\mathcal{V}^U$. Note that $\mathcal{V} = \{\mathcal{V}^L, \mathcal{V}^U\}$ and in the present problem $|\mathcal{V}^L| << |\mathcal{V}^U|$ since only few-shot labeled data is given. As network anomaly detection is commonly formulated as a ranking problem, the present disclosure formally defines the few-shot cross-network anomaly detection problem as follows: Problem 1. Few-Shot Cross-Network Anomaly Detection Given: P auxiliary networks, i.e., $$\mathcal{G}^s = \{G_1^s = (A_1^s, X_1^s), G_2^s = (A_2^s, X_2^s), \ldots, G_P^s = (A_P^s, X_P^s)\}$$

and a target network $G^t = (A^t, X^t)$, each of which contains a set of few-shot labeled anomalies (i.e., $$\mathcal{V}_1^L, \mathcal{V}_2^L, \ldots, \mathcal{V}_P^L \text{ and } \mathcal{V}_t^L).$$

Goal: to learn an anomaly detection model, which is capable of leveraging the knowledge of ground-truth anomalies from the multiple auxiliary networks, i.e., $$\{G_1^s, G_2^s, \ldots, G_P^s\},$$

to detect abnormal nodes in the target network $G^t$. Ideally, anomalies that are detected should have higher ranking scores than that of the normal nodes.

Present System

The present application outlines an anomaly detection system 100 (FIG. 2A) including a Graph Deviation Network (GDN), which is a new family of graph neural networks that enables anomaly detection on an arbitrary individual network (e.g., an input network 10) with limited labeled data. The GDN quantifies an abnormality of each node in an input network 10 to identify anomalous nodes. The GDN includes a network encoder module that learns node representations and an abnormality valuator module that quantifies a deviation of each node relative to other nodes in the network based on their node representations. The final outputs of the anomaly detection system 100 are predicted anomaly scores for each node in the input network 10, where the anomaly scores are determined based on how node representations for each respective node in the input network 10 deviate from those of "normal nodes" within the input network as determined by the abnormality valuator module. The anomaly detection system 100 incorporates a deviation loss and prior distribution to optimize the GDN by fitting the distribution of node representations relative to a normal distribution, ensuring that the GDN assigns high anomaly scores to nodes that deviate from the normal distribution.

Further, the present application outlines a cross-network meta-knowledge transfer system (referred to herein as Meta-GDN 300 in FIG. 2B) that enables the anomaly detection system 100 to learn anomaly detection tasks by transferring meta-knowledge across multiple auxiliary networks to enable few-shot anomaly detection on a target network (which can in some embodiments be the input network 10). Meta-GDN 300 essentially transfers knowledge of other anomaly detection tasks on a plurality of auxiliary networks and teaches the GDN of the anomaly detection system 100 to identify anomalous nodes in an input network 10 with new attributes through exposure to different auxiliary networks having different kinds of anomalous nodes of their own. In particular, Meta-GDN 300 initializes model parameters of the GDN of the anomaly detection system 100 by "showing" the GDN different anomaly detection tasks across different auxiliary networks so that the GDN of the anomaly detection system 100 is able to identify anomalies in the input network 10 with limited labeled ground truth examples from the input network 10. After learning a generalized model of how anomalies present across different auxiliary networks, the GDN of the anomaly detection system 100 can be fine-tuned on the input network 10 using limited labeled data. The anomaly detection system 100 is shown in FIG. 2A and the Meta-GDN 300 is shown in FIG. 2B.

Graph Deviation Networks

Figure 2A:
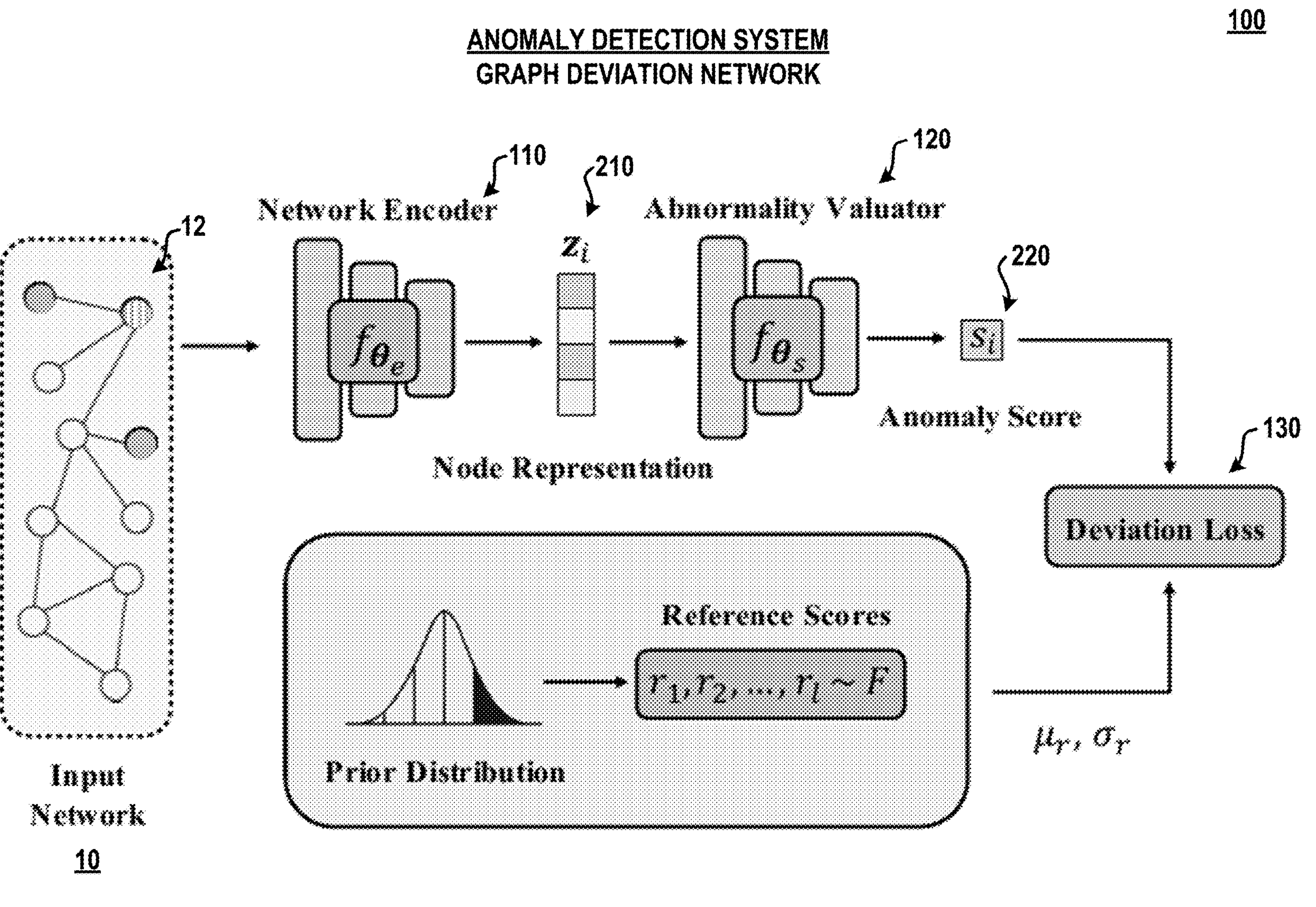
FIGS. 2A and 2B are each an illustration showing the model architecture of a Graph Deviation Networks (GDN) for network anomaly detection and the overall framework Meta-GDN.
Figure 2B:
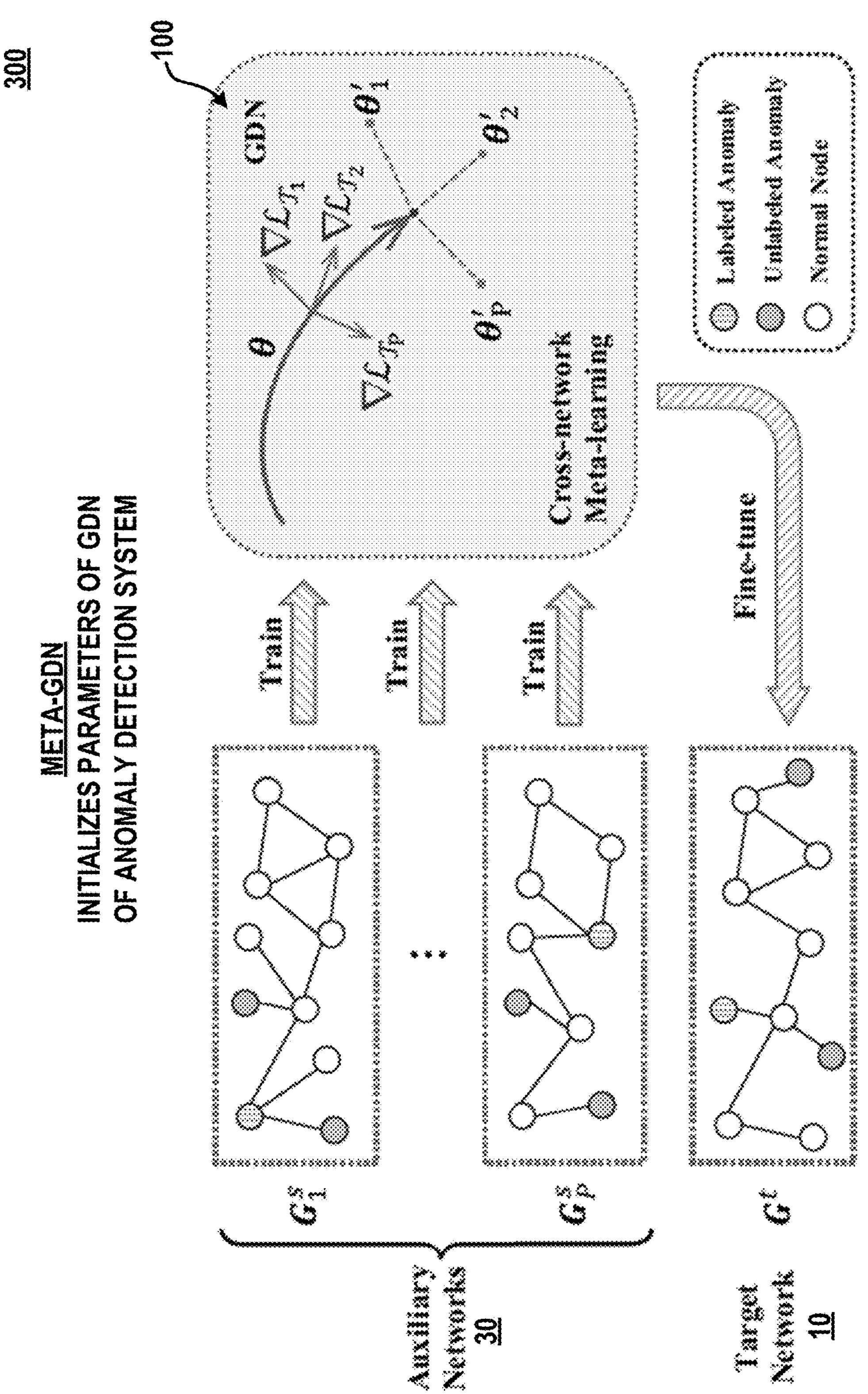

The anomaly detection system 100 of FIG. 2A includes the GDN to enable anomaly detection on an arbitrary network with few-shot labeled data. In essence, the GDN incorporated by the anomaly detection system 100 includes three key building blocks, including: (1) a network encoder module 110 for learning node representations; (2) an abnormality valuator module 120 for estimating the anomaly score for each node; and (3) a deviation loss module 130 for optimizing the model with few-shot labeled anomalies. The details are as follows:

Network Encoder. To learn expressive node representations from an input network 10, the network encoder module 110 is constructed. Specifically, the network encoder module 110 can be built with multiple GNN layers that encode each node 12 within the input network 10 to a low-dimensional latent node representation 210 denoted by $z_i$. In general, GNNs follow the neighborhood message-passing mechanism, and compute the low-dimensional latent node representations 210 by aggregating features from local neighborhoods of the input network 10 in an iterative manner. Formally, a generic GNN layer determines the low-dimensional latent node representations 210 using two key functions:

$$\mathbf{h}_{\mathcal{N}_i}^l = AGGREGATE^l(\{h_j^{l-1} \mid \forall j \in \mathcal{N}_i \cup v_i\}), \tag{1}$$
$$h_i^l = TRANSFORM^l(h_i^{l-1}, \mathbf{h}_{\mathcal{N}_i}^l),$$

where $$h_i^l$$

is the latent representation of node $v_i$ at the l-th layer and $\mathcal{N}$ is the set of first-order neighboring nodes of node $v_i$. Notably, AGGREGATE(•) is an aggregation function that aggregates messages from neighboring nodes and TRANSFORM(•) computes the new representation of a node according to its previous-layer representation and the aggregated messages from neighbors.

To capture the long-range node dependencies in the network, multiple GNN layers are stacked in the network encoder module 110. Thus, the network encoder module 110 can be represented by:

$$H^1 = GNN^1(A, X), \quad (2)$$
$$\ldots$$
$$Z = GNN^L(A, H^{L-1}),$$

where Z is a total set of learned node representations (e.g., the low-dimensional latent node representations 210 individually denoted by $z_i$ for node $v_i$) from the network encoder module 110. For simplicity, a parameterized function $f_{\theta_e}(\bullet)$ denotes the network encoder module 110 with L GNN layers. It is worth noting that the network encoder module 110 is compatible with arbitrary GNN-based architecture, and here a Simple Graph Convolution (SGC) is employed.

Abnormality Valuator. Afterwards, the low-dimensional latent node representations 210 from the network encoder module 110 are passed to the abnormality valuator module 120 (denoted by $f_{\theta_s}(\bullet)$) for further estimating the abnormality of each node 12 of the input network 10. In some embodiments, the abnormality valuator module 120 can be built with two feed-forward layers that transform the low-dimensional latent node representations 210 to a set of scalar anomaly scores 220:

$$o_i = ReLU(W_s z_i + b_s), \quad (3)$$
$$s_i = u_s^T o_i + b_s,$$

where $s_i$ is the anomaly score of node $v_i$ and $o_i$ is the intermediate output. $W_s$ and $u_s$ are the learnable weight matrix and weight vector, respectively. $b_s$ and $b_s$ are corresponding bias terms.

Specifically, the whole GDN model $f_\theta(\bullet)$ embodied by the anomaly detection system 100 can be formally represented as:

$$f_\theta(A, X) = f_{\theta_s}(f_{\theta_e}(A, X)), \quad (4)$$

which directly maps the input network 10 to scalar anomaly scores and can be trained in an end-to-end fashion.

Deviation Loss. In essence, the objective of the anomaly detection system 100 is to distinguish normal nodes (e.g., non-anomalous nodes) from abnormal nodes of the input network 10 according to the computed anomaly scores with few-shot labels. The deviation loss module 130 enforces the model to assign large anomaly scores to anomalous nodes within the input network 10 whose characteristics significantly deviate from normal nodes within the input network 10. To guide the learning process of the GDN model of the anomaly detection system 100, a reference score (e.g., $\mu_r$) is first defined as the mean value of the anomaly scores of a set of randomly selected normal nodes of the input network 10. The reference score quantifies how the scores of anomalous nodes of the input network 10 deviate from those of normal nodes of the input network 10.

Gaussian distribution is commonly a robust choice to fit set of anomaly scores for a wide range of datasets. Based on this assumption, the GDN of the anomaly detection system 100 first samples a set of k anomaly scores from the Gaussian prior distribution, i.e., $\mathcal{R}=\{r_1, r_2, \ldots, r_k\} \sim \mathcal{N}(\mu,\sigma^2)$, each of which denote the abnormality of a random normal node of the input network 10. The reference score is computed as the mean value of all the sampled scores:

$$\mu_r = \frac{1}{k}\sum_{i=1}^{k} r_i. \quad (5)$$

With the reference score $\mu_r$, the deviation between an anomaly score of node $v_i$ of the input network 10 and the reference score can be defined by the deviation loss module 130 in the form of standard score:

$$dev(v_i) = \frac{s_i - \mu_r}{\sigma_r}, \quad (6)$$

where $\sigma_r$ is the standard deviation of the set of sampled anomaly scores $\mathcal{R}=\{r_1, \ldots, r_k\}$. Then, the deviation loss module 130 evaluates a final objective function derived from contrastive loss by replacing a distance function with the deviation in Eq. (6):

$$\mathcal{L} = (1 - y_i)\cdot|dev(v_i)| + y_i \cdot \max(0, m - dev(v_i)), \quad (7)$$

where $y_i$ is the ground-truth label of input node $v_i$ of the input network 10. If node $v_i$ of the input network 10 is an abnormal node, $y_i$=1, otherwise, $y_i$=0. Note that m is a confidence margin which defines a radius around the deviation.

By minimizing the above loss function, the GDN of the anomaly detection system 100 will push the anomaly scores of normal nodes of the input network 10 as close as possible to $\mu_r$, while enforcing a large positive deviation of at least m between $\mu_r$ and the anomaly scores of abnormal nodes of the input network 10. In this way, the GDN of the anomaly detection system 100 learns a high-level abstraction of normal patterns with substantially fewer labeled anomalies and empowers the node representation learning to discriminate normal nodes of the input network 10 from anomalies of the input network 10. Accordingly, a large anomaly score will be assigned to a node of the input network 10 if its pattern significantly deviates from the learned abstraction of normal patterns.

Preliminary results showed that the GDN of the anomaly detection system 100 is not sensitive to the choices of μ and σ as long as σ is not too large. Specifically, the anomaly detection system 100 sets μ=0 and σ=1 in the experiments, which helped the GDN achieve stable detection performance on different datasets. It is also worth mentioning that as the GDN cannot access the labels of normal nodes, the unlabeled nodes in $\mathcal{V}^U$ are simply considered as normal. Note that the remaining unlabeled anomalous nodes of the input network 10 and all the normal nodes of the input network 10 were treated as normal, thus contamination can be introduced to the training set (i.e., the ratio of unlabeled anomalies to the total unlabeled training data $\mathcal{V}^U$). Remarkably, the GDN of the anomaly detection system 100 performed very well by using this simple strategy and was found to be robust to different contamination levels. The effect of different contamination levels to model performance is evaluated herein.

Cross-Network Meta-Learning

The GDN embodied by the anomaly detection system 100 is operable to effectively detect anomalies on an arbitrary network (e.g., the input network 10) with limited labeled data. When auxiliary networks from the same domain of the target network are available, the problem of how to transfer such valuable knowledge is the key to enable few-shot anomaly detection on the target network. Despite its feasibility, the performance of the anomaly detection system 100 would be rather limited using the ideas of existing cross-network learning methods. The main reason is that existing methods merely focus on transferring the knowledge from only a single network, which may cause negative transfer due to the divergent characteristics of anomalies on different networks. To this end, the anomaly detection system 100 exploits multiple auxiliary networks to distill comprehensive knowledge of anomalies.

As an effective paradigm for extracting and transferring knowledge, meta-learning has recently received increasing research attention because of the broad applications in a variety of high-impact domains. In essence, the goal of meta-learning is to train a model on a variety of learning tasks, such that the learned model is capable of effectively adapting to new tasks with very few or even one labeled data. The anomaly detection system 100 can use a cross-network meta-knowledge transfer system (e.g., Meta-GDN 300) to initialize the GDN of the anomaly detection system 100 using a plurality of auxiliary networks 30. The Meta-GDN 300 possesses the generalization ability to effectively identify anomalous nodes within a new target network (e.g., the input network 10). Specifically, Meta-GDN 300 extracts meta-knowledge of ground-truth anomalies from different few-shot network anomaly detection tasks on the plurality of auxiliary networks 30 during the training phase, and can be further fine-tuned for the new task on the target network (e.g., the input network 10), such that the anomaly detection system 100 can make fast and effective adaptation.

The present disclosure defines each learning task as performing few-shot anomaly detection on an individual network (e.g., the input network 10), whose objective is to enforce large anomaly scores to be assigned to anomalies as defined in Eq. (7). Let $\mathcal{T}_i$ denote the few-shot network anomaly detection task constructed from network $$G_i^s,$$

then the Meta-GDN 300 has P learning tasks in each epoch. In addition, the Meta-GDN 300 considers a model of the GDN of the anomaly detection system 100 represented by a parameterized function $f_\theta$ with parameters θ. Given P tasks, the optimization algorithm applied by the Meta-GDN 300 first adapts the initial model parameters θ of the GDN of the anomaly detection system 100 to $$\theta_i'$$

for each learning task $\mathcal{T}_i$ independently. Specifically, the updated model parameter $$\theta_i'$$

the GDN is computed using $\mathcal{L}_{\mathcal{T}_i}$ on a batch of training data sampled from $\mathcal{V}_i^{\mathcal{L}}$ and $$\mathcal{V}_i^U$$

in $$G_i^s.$$

Formally, the parameter update with one gradient step can be expressed as:

$$\theta_i' = \theta - \alpha \nabla_\theta \mathcal{L}_{\mathcal{T}_i}(f_\theta), \tag{8}$$

where α controls the meta-learning rate. Note that Eq. (8) only includes one-step gradient update, while it is straightforward to extend to multiple gradient updates.

The model parameters of the GDN of the anomaly detection system 100 are trained by optimizing for the best performance of $f_\theta$ with respect to θ across all learning tasks. More concretely, the meta-objective function is defined as follows:

$$\min_\theta \sum_{i=1}^{P} \mathcal{L}_{\mathcal{T}_i}(f_{\theta_i'}) = \min_\theta \sum_{i=1}^{P} \mathcal{L}_{\mathcal{T}_i}\left(f_{\theta - \alpha \nabla_\theta \mathcal{L}_{\mathcal{T}_i}(f_\theta)}\right), \tag{9}$$

By optimizing the objective of the GDN, the updated model parameters of the GDN of the anomaly detection system 100 can preserve the capability of detecting anomalies on each network. Since the meta-optimization is performed over parameters θ with the objective computed using the updated parameters $$\theta_i'$$

for all tasks, correspondingly, the model parameters are optimized such that one or a small number of gradient steps on the target task (network) will produce great effectiveness.

Formally, the Meta-GDN 300 leverages stochastic gradient descent (SGD) to update the model parameters θ of the anomaly detection system 100 across all tasks, such that the model parameters θ are updated as follows:

$$\theta \leftarrow \theta - \beta\nabla_\theta \sum_{i=1}^{P} \mathcal{L}_{\mathcal{T}_i}(f_{\theta_i'}), \tag{10}$$

where β is the meta step size. The full algorithm is summarized in Algorithm 1. Specifically, for each batch, the Meta-GDN 300 randomly samples the same number of nodes from unlabeled data (i.e., $\mathcal{V}^U$) and labeled anomalies (i.e., $\mathcal{V}^L$) to represent normal and abnormal nodes, respectively (Step-4).

Algorithm 1 The learning algorithm of Meta-GDN

Input: (1) P auxiliary networks, i.e., $\mathcal{G}^s = \{G_1^s = (A_1^s, X_1^s), G_2^s = (A_2^s, X_2^s), \ldots, G_p^s = (A_p^s, X_p^s)\}$;

(2) a target network $G^t = (A^t, X^t)$; (3) set of few-shot labeled anomalies and unlabeled nodes for each network (i.e., $\{\mathcal{V}_1^L, \mathcal{V}_1^U\}, \ldots, \{\mathcal{V}_P^L$ and $\mathcal{V}_P^U\}$ and $\{\mathcal{V}_t^L, \mathcal{V}_t^U\}$;

(4) training epochs E, batch size b, meta-learning hyper-parameters α, β.

Output: Anomaly scored of nodes in $V_t^U$.

1: Initialize parameters θ;
2: while e < E do
3: for each network $G_1^s$ (task $\mathcal{T}_i$) do
4: Randomly sample $\frac{b}{2}$ nodes from $V_i^L$ and $\frac{b}{2}$ from $V_i^U$ to comprise the batch $B_i$;
5: Evaluate $\nabla_\theta \mathcal{L}_{\mathcal{T}_i}(f_\theta)$ using $B_i'$ and $\mathcal{L}(\cdot)$ in Eq. (7);
6: Compute adapted parameters θ' with gradient descent using Eq. (8), $\theta_i' \leftarrow \theta - \alpha\nabla_\theta \mathcal{L}_{\mathcal{T}_i}(f_\theta)$;
7: Sample a new batch $B_i'$ for the meta-update;
8: end for
9: Update $\theta \leftarrow \theta - \beta\nabla_\theta \sum_{i=1}^{P} \mathcal{L}_{\mathcal{T}_i}(f_{\theta_i'})$, using $\{B_i'\}$ and $\mathcal{L}(\cdot)$ according to Eq. (7);
10: end while
11: Fine-tune θ on target network $G^t$ with $\{\mathcal{V}_t^L; \mathcal{V}_t^U\}$;
12: Compute anomaly scores for nodes in $\mathcal{V}_t^U$;

TABLE 1

Statistics of evaluation datasets. $r_1$ denotes the ratio of labeled anomalies to the total anomalies and $r_2$ is the ratio of labeled anomalies to the total number of nodes.

| Datasets | Yelp | PubMed | Reddit |
|---|---|---|---|
| # nodes (avg.) | 4,872 | 3,675 | 15,860 |
| # edges (avg.) | 43,728 | 8,895 | 136,781 |
| # features | 10,000 | 500 | 602 |
| # anomalies (avg.) | 223 | 201 | 796 |
| $r_1$ (avg.) | 4.48% | 4.97% | 1.26% |
| $r_2$ (avg.) | 0.21% | 0.27% | 0.063% |

Experiments

In this section, empirical evaluations were performed to demonstrate the effectiveness of the present framework. Specifically, the following research questions were answered:

RQ1. How effective is the Meta-GDN 300 for detecting anomalies on the target network (e.g., the input network 10) with few or even one labeled instance?

RQ2. How much will the performance of the Meta-GDN 300 change by providing different numbers of auxiliary networks or different anomaly contamination levels?

RQ3. How does each component of the Meta-GDN 300 (i.e., graph deviation networks or cross-network meta-learning) contribute to the final detection performance?

Experimental Setup

Evaluation Datasets. In the experiment, the present system adopts three real-world datasets, which are publicly available and have been widely used in previous research. Table 1 summarizes the statistics of each dataset. The detailed description is as follows:

Yelp is collected from Yelp.com and contains reviews for restaurants in several states of the U.S., where the restaurants are organized by ZIP codes. The reviewers are classified into two classes, abnormal (reviewers with only filtered reviews) and normal (reviewers with no filtered reviews) according to the Yelp anti-fraud filtering algorithm. The present system selects restaurants in the same location according to ZIP codes to construct each network, where nodes represent reviewers and there is a link between two reviewers if they have reviewed the same restaurant. The present system applies the bag-of-words model on top of the textual contents to obtain the attributes of each node.

PubMed is a citation network where nodes represent scientific articles related to diabetes and edges are citations relations. Node attribute is represented by a TF/IDF weighted word vector from a dictionary which consists of 500 unique words. The present system randomly partitions the large network into non-overlapping sub-networks of similar size.

Reddit is collected from an online discussion forum where nodes represent threads and an edge exits between two threads if they are commented by the same user. The node attributes are constructed using averaged word embedding vectors of the threads. Similarly, the present system extracts non-overlapping sub-networks from the original large network for our experiments.

Note that except the Yelp dataset, the present system is not able to access ground-truth anomalies for PubMed and Reddit. Thus, the present system refers to two anomaly injection methods to inject a combined set of anomalies (i.e., structural anomalies and contextual anomalies) by perturbing the topological structure and node attributes of the original network, respectively. To inject structural anomalies, the present system adopts the approach used to generate a set of small cliques since small clique is a typical abnormal substructure in which a small set of nodes are much more closely linked to each other than average. Accordingly, the present system randomly selects c nodes (i.e., clique size) in the network and then make these nodes fully linked to each other. By repeating this process K times (i.e., K cliques), the present system can obtain K×c structural anomalies. During experimentation, the present system sets the clique size c to 15. In addition, we leverage the method introduced to generate contextual anomalies. Specifically, the present system first randomly selects a node i and then randomly sample another 50 nodes from the network. The node j were chosen whose attributes have the largest Euclidean distance from node i among the 50 nodes. The attributes of node i (i.e., $x_i$) will then be replaced with the attributes of node j (i.e., $x_j$). Note that the present system injects structural and contextual anomalies with the same quantity and the total number of injected anomalies is around 5% of the network size.

Comparison Methods. The present system compare the Meta-GDN and its base model GDN with two categories of anomaly detection methods, including (1) feature-based methods (i.e., LOF, Autoencoder and DeepSAD) where only the node attributes are considered, and (2) network-based methods (i.e., SCAN, ConOut, Radar, DOMINANT, and SemiGNN) where both topological information and node attributes are involved. Details of these compared baseline methods are as follows:

LOF is a feature-based approach which detects outliers at the contextual level.

Autoencoder is a feature-based unsupervised deep autoencoder model which introduces an anomaly regularizing penalty based upon L1 or L2 norms.

DeepSAD is a state-of-the-art deep learning approach for general semi-supervised anomaly detection. During experimentation, the present system leverages the node attribute as the input feature.

SCAN is an efficient algorithm for detecting network anomalies based on a structural similarity measure.

ConOut identifies network anomalies according to the corresponding subgraph and the relevant subset of attributes in the local context.

Radar is an unsupervised method that detects anomalies on attributed network by characterizing the residuals of attribute information and its coherence with network structure.

DOMINANT is a GCN-based autoencoder framework which computes anomaly scores using the reconstruction errors from both network structure and node attributes.

SemiGNN is a semi-supervised GNN model, which leverages the hierarchical attention mechanism to better correlate different neighbors and different views.

Evaluation Metrics. In the present disclosure, the following metrics are used to have a comprehensive evaluation of the performance of different anomaly detection methods:

AUC-ROC is widely used in previous anomaly detection research. Area under curve (AUC) is interpreted as the probability that a randomly chosen anomaly receives a higher score than a randomly chosen normal object.

AUC-PR is the area under the curve of precision against recall at different thresholds, and it only evaluates the performance on the positive class (i.e., abnormal objects). AUC-PR is computed as the average precision and is used as the evaluation metric.

Precision@K is defined as the proportion of true anomalies in a ranked list of K objects. The present system obtains the ranking list in descending order according to the anomaly scores that are computed from a specific anomaly detection algorithm.

Implementation Details. Regarding the proposed GDN model, the Simple Graph Convolution was used to build the network encoder with degree K=2 (two layers). As shown in Eq. (3), the abnormality valuator employs a two-layer neural network with one hidden layer of 512 units followed by an output layer of 1 unit. The confidence margin (i.e., m) in Eq. (7) is set as 5 and the reference score (i.e., $\mu_r$) is computed using Eq. (5) from k=5,000 scores that are sampled from a Gaussian prior distribution, i.e., $\mathcal{N}(0,1)$. Unless otherwise specified, we set the total number of networks as 5 (4 auxiliary networks and 1 target network), and for each one we have access to 10 labeled abnormal nodes that are randomly selected from the set of labeled anomalies ($\mathcal{V}^L$) in every run of the experiment. For model training, the proposed GDN and Meta-GDN are trained with 1000 epochs, with batch size 16 in each epoch, and a 5-step gradient update is leveraged to compute θ' in the meta-optimization process. The network-level learning rate α is 0.01 and the metalevel learning rate β=0.001. Fine-tuning is performed on the target network where the corresponding nodes are split into 40% for fine-tuning, 20% for validation, and 40% for testing. For all the comparison methods, we select the hyper-parameters with the best performance on the validation set and report the results on the test data of the target network for a fair comparison. Particularly, for all the network-based methods, the whole network structure and node attributes are accessible during training.

TABLE 2

Performance comparison results (10-shot) w.r.t. AUC-ROC and AUC-PR on three datasets.

| | Yelp | | PubMed | | Reddit | |
|---|---|---|---|---|---|---|
| Methods | AUC-ROC | AUC-PR | AUC-ROC | AUC-PR | AUC-ROC | AUC-PR |
| LOF | 0.375 ± 0.011 | 0.042 ± 0.004 | 0.575 ± 0.007 | 0.187 ± 0.016 | 0.518 ± 0.015 | 0.071 ± 0.006 |
| Autoencoder | 0.365 ± 0.013 | 0.041 ± 0.008 | 0.584 ± 0.018 | 0.236 ± 0.005 | 0.722 ± 0.012 | 0.347 ± 0.007 |
| DeepSAD | 0.460 ± 0.008 | 0.062 ± 0.005 | 0.528 ± 0.008 | 0.115 ± 0.004 | 0.503 ± 0.010 | 0.066 ± 0.005 |
| SCAN | 0.397 ± 0.011 | 0.046 ± 0.005 | 0.421 ± 0.016 | 0.048 ± 0.005 | 0.298 ± 0.009 | 0.048 ± 0.002 |
| ConOut | 0.402 ± 0.015 | 0.041 ± 0.005 | 0.511 ± 0.019 | 0.093 ± 0.012 | 0.551 ± 0.008 | 0.085 ± 0.007 |
| Radar | 0.415 ± 0.012 | 0.045 ± 0.007 | 0.573 ± 0.013 | 0.244 ± 0.011 | 0.721 ± 0.008 | 0.281 ± 0.007 |
| DOMINANT | 0.578 ± 0.018 | 0.109 ± 0.003 | 0.636 ± 0.021 | 0.337 ± 0.013 | 0.735 ± 0.013 | 0.357 ± 0.009 |
| SemiGNN | 0.497 ± 0.004 | 0.058 ± 0.003 | 0.523 ± 0.008 | 0.065 ± 0.006 | 0.610 ± 0.007 | 0.134 ± 0.003 |
| GDN (ours) | 0.678 ± 0.015 | 0.132 ± 0.009 | 0.736 ± 0.012 | 0.438 ± 0.012 | 0.811 ± 0.015 | 0.379 ± 0.011 |
| Meta-GDN (ours) | 0.724 ± 0.012 | 0.175 ± 0.011 | 0.761 ± 0.014 | 0.485 ± 0.010 | 0.842 ± 0.011 | 0.395 ± 0.009 |

TABLE 3

Few-shot performance evaluation of Meta-GDN w.r.t. AUC-ROC and AUC-PR.

| | Yelp | | PubMed | | Reddit | |
|---|---|---|---|---|---|---|
| Setting | AUC-ROC | AUC-PR | AUC-ROC | AUC-PR | AUC-ROC | AUC-PR |
| 1-shot | 0.702 ± 0.008 | 0.159 ± 0.015 | 0.742 ± 0.012 | 0.462 ± 0.013 | 0.821 ± 0.013 | 0.821 ± 0.013 |
| 3-shot | 0.709 ± 0.006 | 0.164 ± 0.010 | 0.748 ± 0.008 | 0.468 ± 0.008 | 0.828 ± 0.012 | 0.386 ± 0.007 |
| 5-shot | 0.717 ± 0.013 | 0.169 ± 0.007 | 0.753 ± 0.011 | 0.474 ± 0.005 | 0.834 ± 0.009 | 0.389 ± 0.008 |
| 10-shot | 0.724 ± 0.012 | 0.175 ± 0.011 | 0.761 ± 0.014 | 0.485 ±0.010 | 0.842 ± 0.011 | 0.395 ± 0.009 |

Effectiveness Results (RQ1)

Figure 3A:
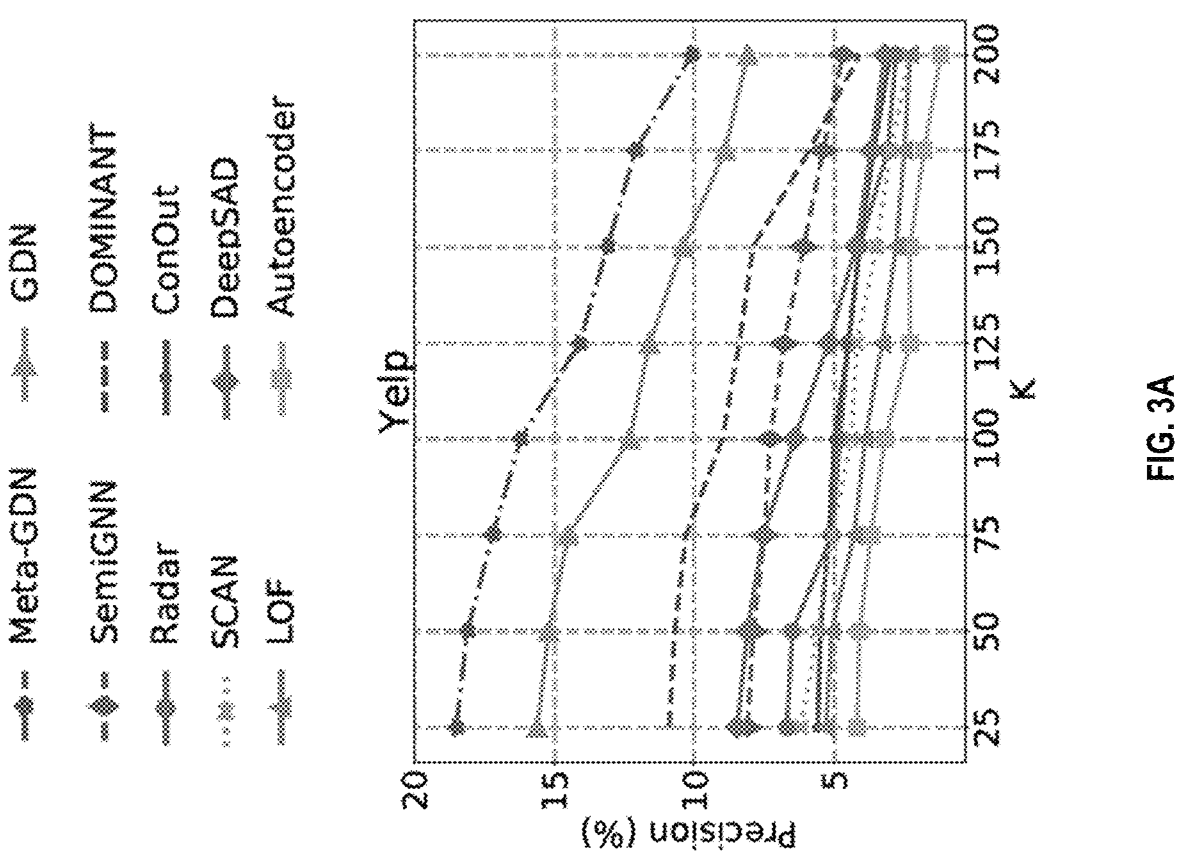
FIGS. 3A-3C are a series of graphical representations showing performance comparison results (10-shot) with respect to Precision@K on three datasets.
Figure 3B:
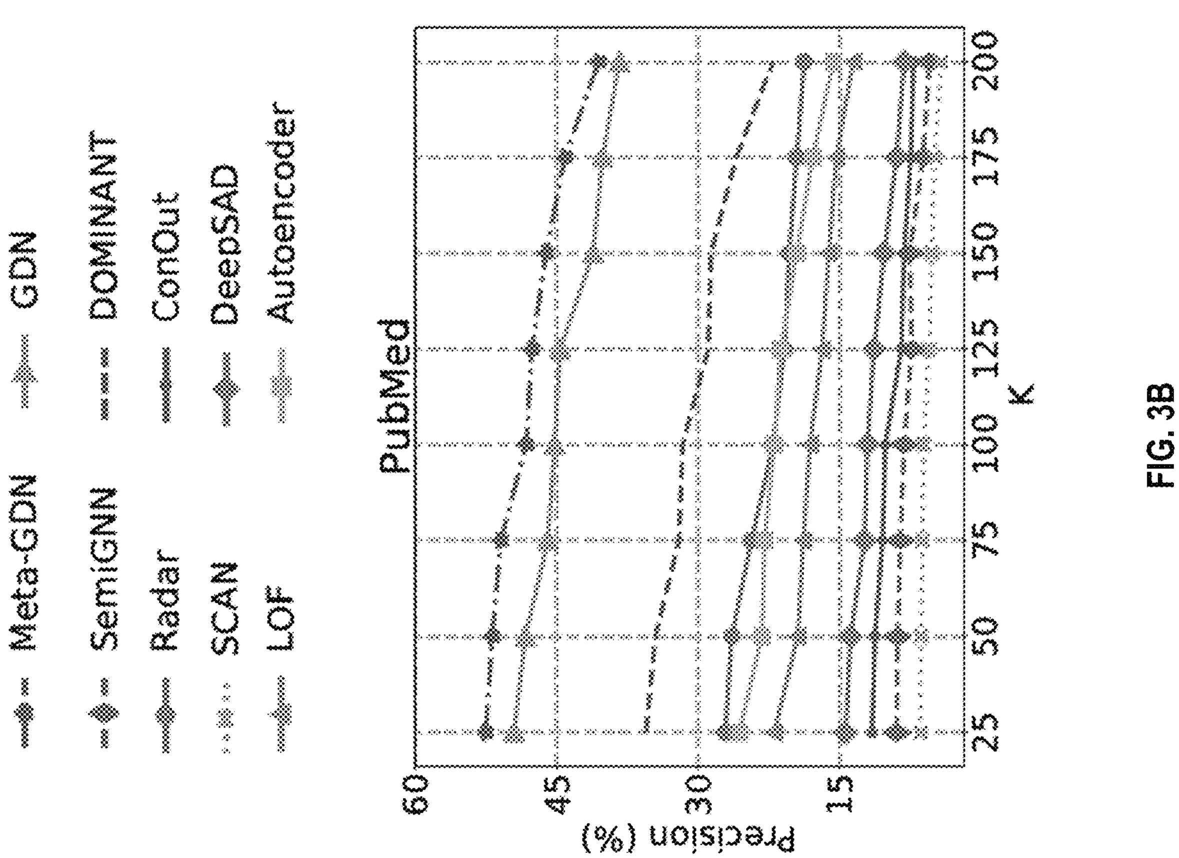
Figure 3C:
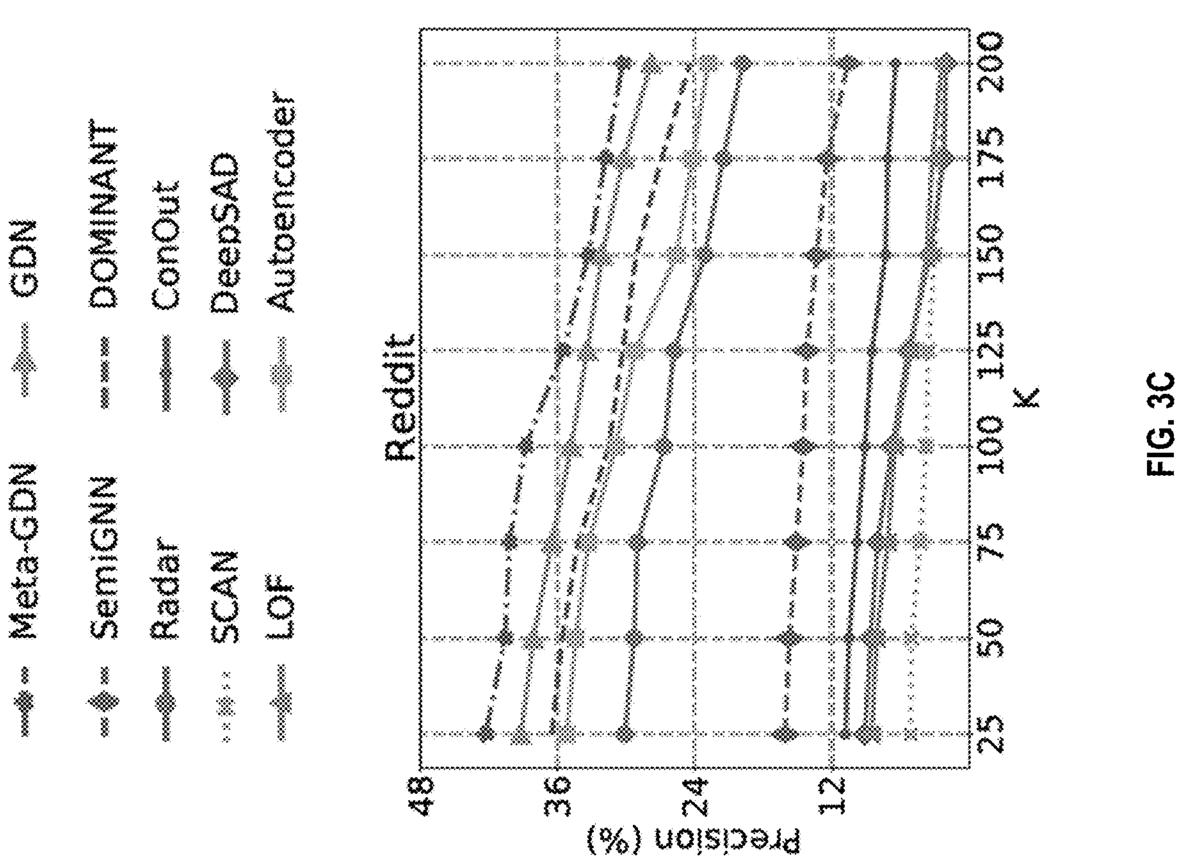

Overall Comparison. During experimentation, the performance of the Meta-GDN is evaluated along with its base model GDN by comparing with the included baseline methods. The evaluation results (10-shot) was first presented w.r.t. AUC-ROC and AUC-PR in Table 2 and the results w.r.t. Precision@K are visualized in FIGS. 3A-3C. Accordingly, the following observations, were made including: (1) in terms of AUC-ROC and AUC-PR, Meta-GDN outperformed all the other compared methods by a significant margin. Meanwhile, the results w.r.t. Precision@K again demonstrated that Meta-GDN can better rank abnormal nodes on higher positions than other methods by estimating accurate anomaly scores; (2) unsupervised methods (e.g., DOMINANT, Radar) were not able to leverage supervised knowledge of labeled anomalies and therefore have limited performance. Semi-supervised methods (e.g., DeepSAD, SemiGNN) also fail to deliver satisfactory results. The possible explanation is that DeepSAD cannot model network information and SemiGNN requires a relatively large number of labeled data and multi-view data, which make them less effective in the evaluation; and (3) compared to the base model GDN, Meta-GDN was capable of extracting comprehensive meta-knowledge across multiple auxiliary networks by virtue of the cross-network meta-learning algorithm, which further enhances the detection performance on the target network.

Few-shot Evaluation. In order to verify the effectiveness of Meta-GDN in few-shot as well as one-shot network anomaly detection, the present system evaluated the performance of Meta-GDN with different numbers of labeled anomalies on the target network (i.e., 1-shot, 3-shot, 5-shot and 10-shot). Note that the present system respectively set the batch size b to 2, 4, 8, and 16 to ensure that there is no duplication of labeled anomalies exist in a sampled training batch. Also, the present system kept the number of labeled anomalies on auxiliary networks as 10. Table 3 summarizes the AUC-ROC/AUC-PR performance of Meta-GDN under different few-shot settings. By comparing the results in Table 2 and Table 3, it's seen that even with only one labeled anomaly on the target network (i.e., 1-shot), Meta-GDN can still achieve good performance and significantly outperforms all the baseline methods. In the meantime, it can be clearly observed that the performance of Meta-GDN increases with the growth of the number of labeled anomalies, which demonstrates that Meta-GDN can be better fine-tuned on the target network with more labeled examples.

Sensitivity & Robustness Analysis (RQ2)

Figures 4A, 4B:
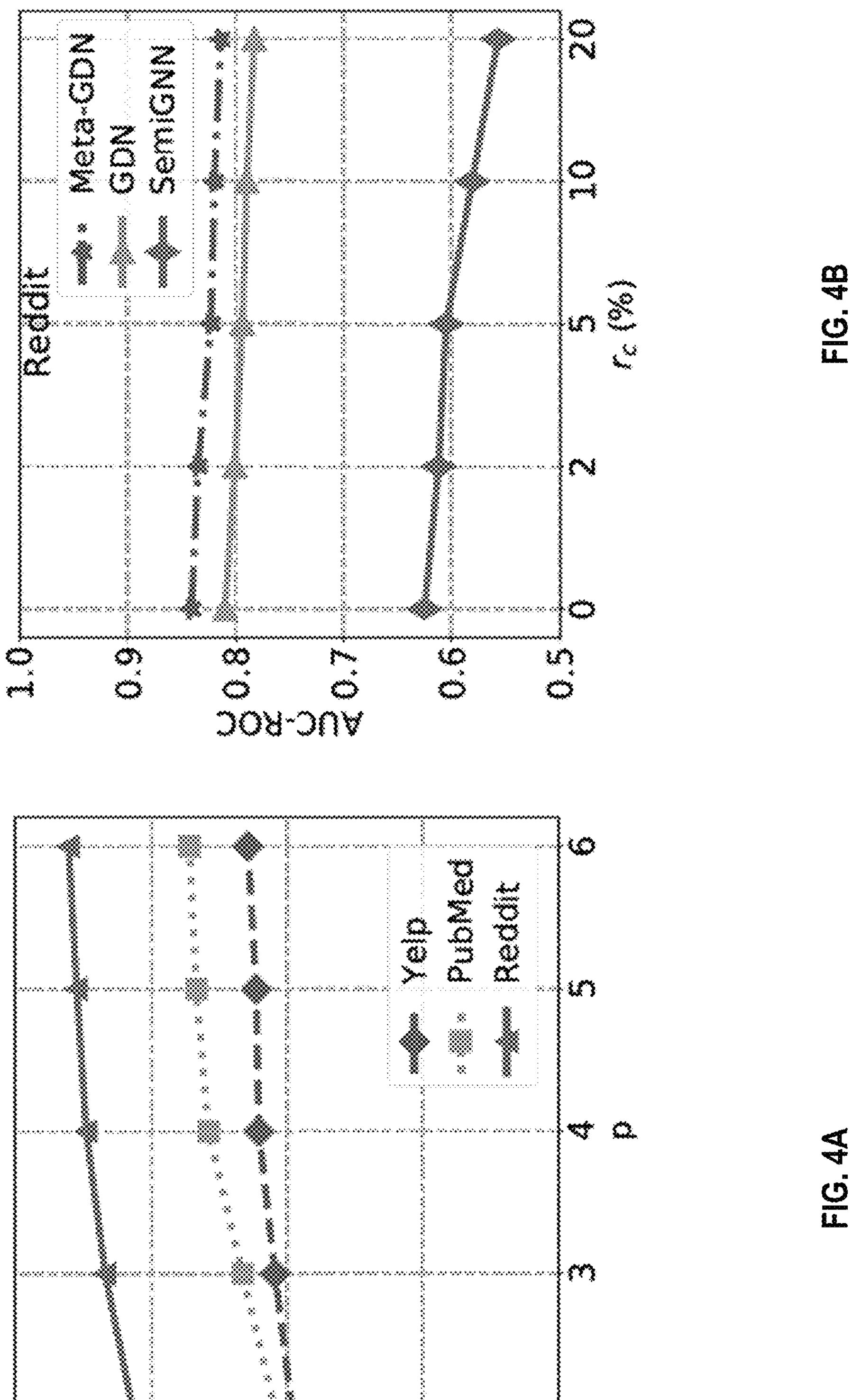
FIG. 4A is a graphical representation showing sensitivity analysis of Meta-GDN with respect to different number of auxiliary networks.
FIG. 4B is a graphical representation showing the model robustness study with respect to AUC-ROC with different contamination levels.

In this section, the sensitivity and robustness of the Meta-GDN is further analyzed. By providing different numbers of auxiliary networks during training, the model sensitivity results w.r.t. AUC-ROC are presented in FIG. 4A. Specifically, it can be clearly found that: (1) as the number of auxiliary networks increases, Meta-GDN achieves constantly stronger performance on all the three datasets. It shows that more auxiliary networks can provide better meta-knowledge during the training process, which is consistent with our intuition; (2) Meta-GDN can still achieve relatively good performance when training with a small number of auxiliary networks (e.g., p=2), which demonstrates the strong capability of its base model GDN. For example, on Yelp dataset, the performance barely drops 0.033 if the present system changes the number of auxiliary networks from p=6 to p=2.

As discussed herein, all the sampled nodes were treated from unlabeled data as normal for computing the deviation loss. This simple strategy introduces anomaly contamination in the unlabeled training data. Because $r_c$ is a small number in practice, the present system can work very well in a wide range of real-world datasets. To further investigate the robustness of Meta-GDN w.r.t. different contamination levels $r_c$ (i.e., the proportion of anomalies in the unlabeled training data), the evaluation results of Meta-GDN, GDN and the semi-supervised baseline method SemiGNN are reported in FIG. 4B. As shown, though the performance of all the methods decreases with increasing contamination levels, both Meta-GDN and GDN are remarkably robust and can consistently outperform SemiGNN to a large extent.

Ablation Study (RQ3)

Figure 5B:
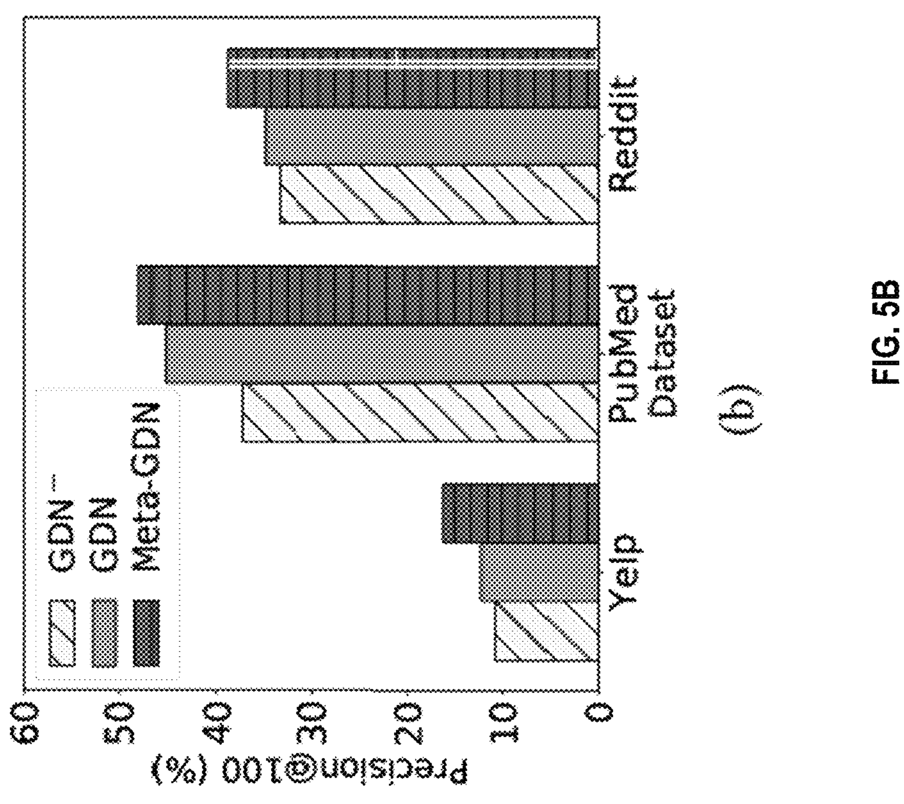
FIG. 5B is a graphical representation of Precision@100 results of Meta-GDN and its variants.
Figure 5A:
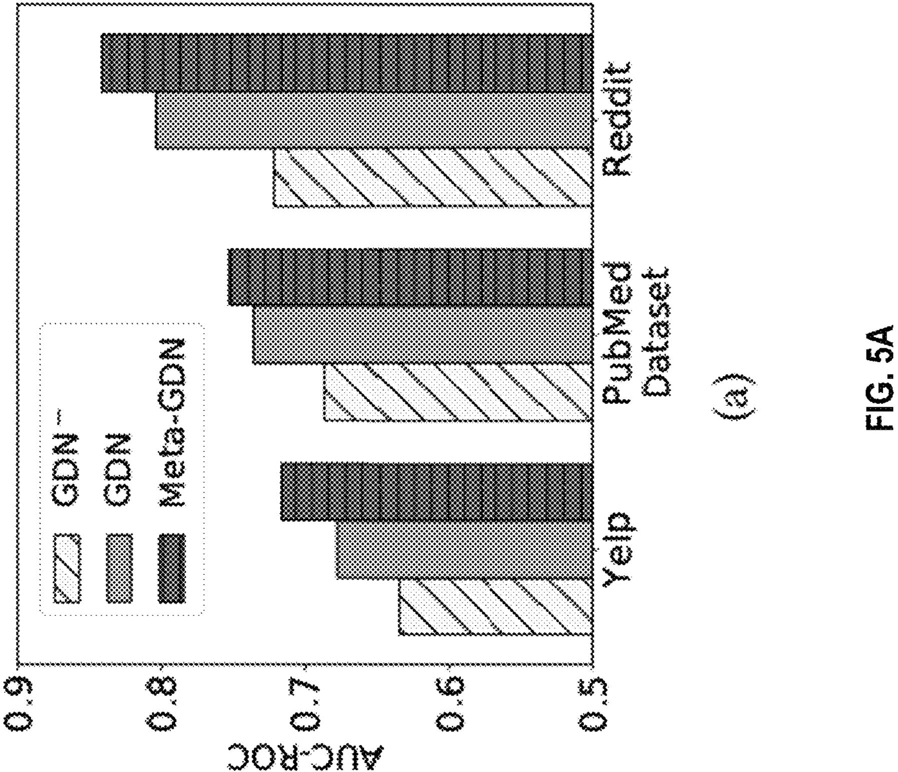
FIG. 5A is a graphical representation of the AUC-ROC results of Meta-GDN and its variants.

Moreover, an ablation study was conducted to better examine the contribution of each key component in the Meta-GDN. In addition to Meta-GDN and its base model GDN, we include another variant $GDN^-$ that excludes the network encoder and cross-network meta-learning in Meta-GDN. The results of AUC-ROC and Precision@100 are presented in FIGS. 5A and 5B, respectively. The corresponding observations are two-fold: (1) by incorporating GNN-based network encoder, GDN largely outperforms $GDN^-$ in anomaly detection on the target network. For example, GDN achieves 8.1% performance improvement over $GDN^-$ on PubMed in terms of precision@100. The main reason is that the GNN-based network encoder is able to extract topological information of nodes and to learn highly expressive node representations; and (2) the complete framework Meta-GDN performs consistently better than the base model GDN on all the three datasets. For instance, Meta-GDN improves AUC-ROC by 5.75% over GDN on Yelp dataset, which verifies the effectiveness of the proposed cross-network meta-learning algorithm for extracting and transferring meta-knowledge across multiple auxiliary networks.

Methods

Figure 6A:
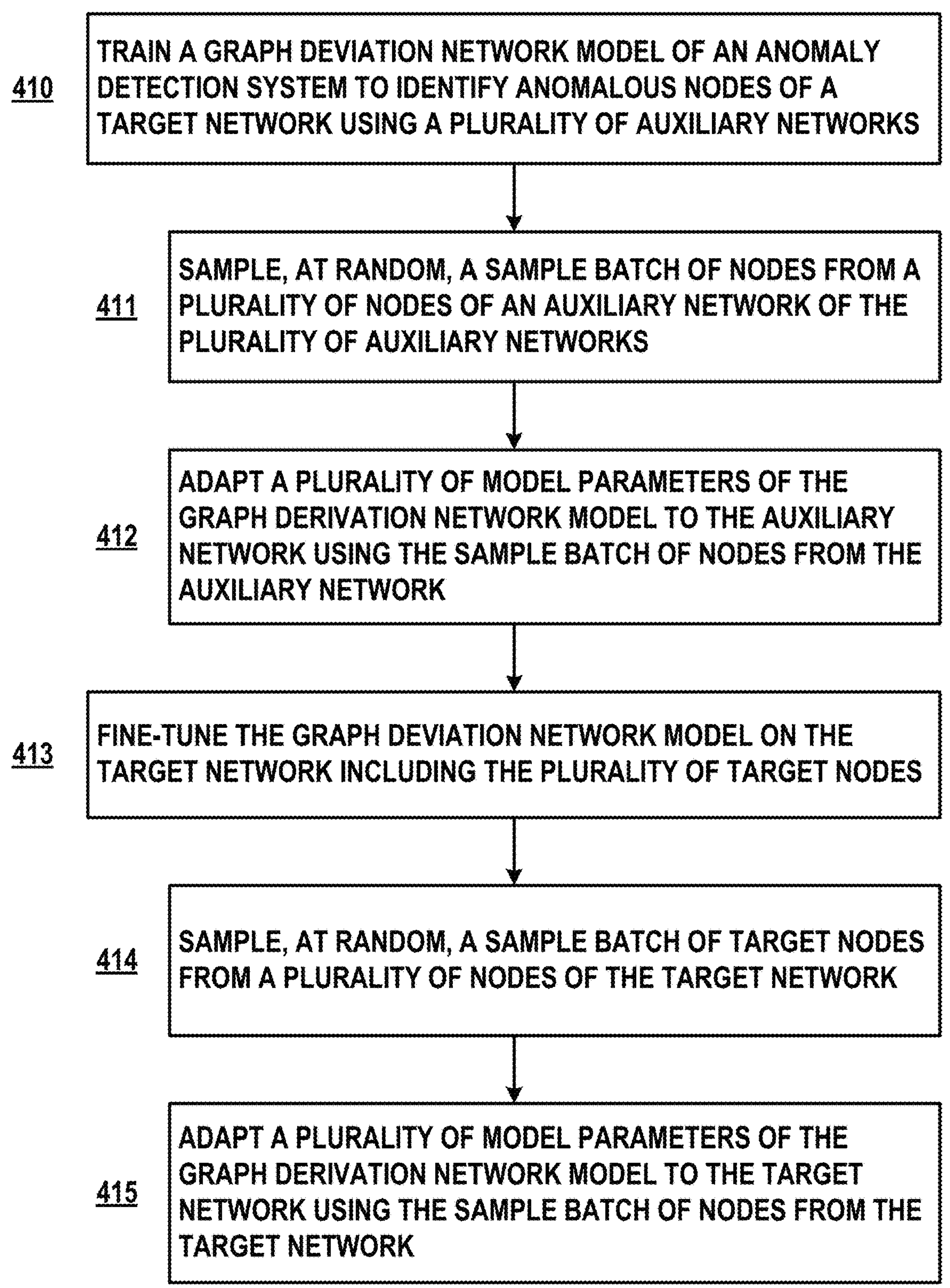
FIGS. 6A and 6B are a pair of process flows showing a method for anomaly detection and training of the anomaly detection system of FIG. 2A by the Meta-GDN of FIG. 2B.
Figure 6B:
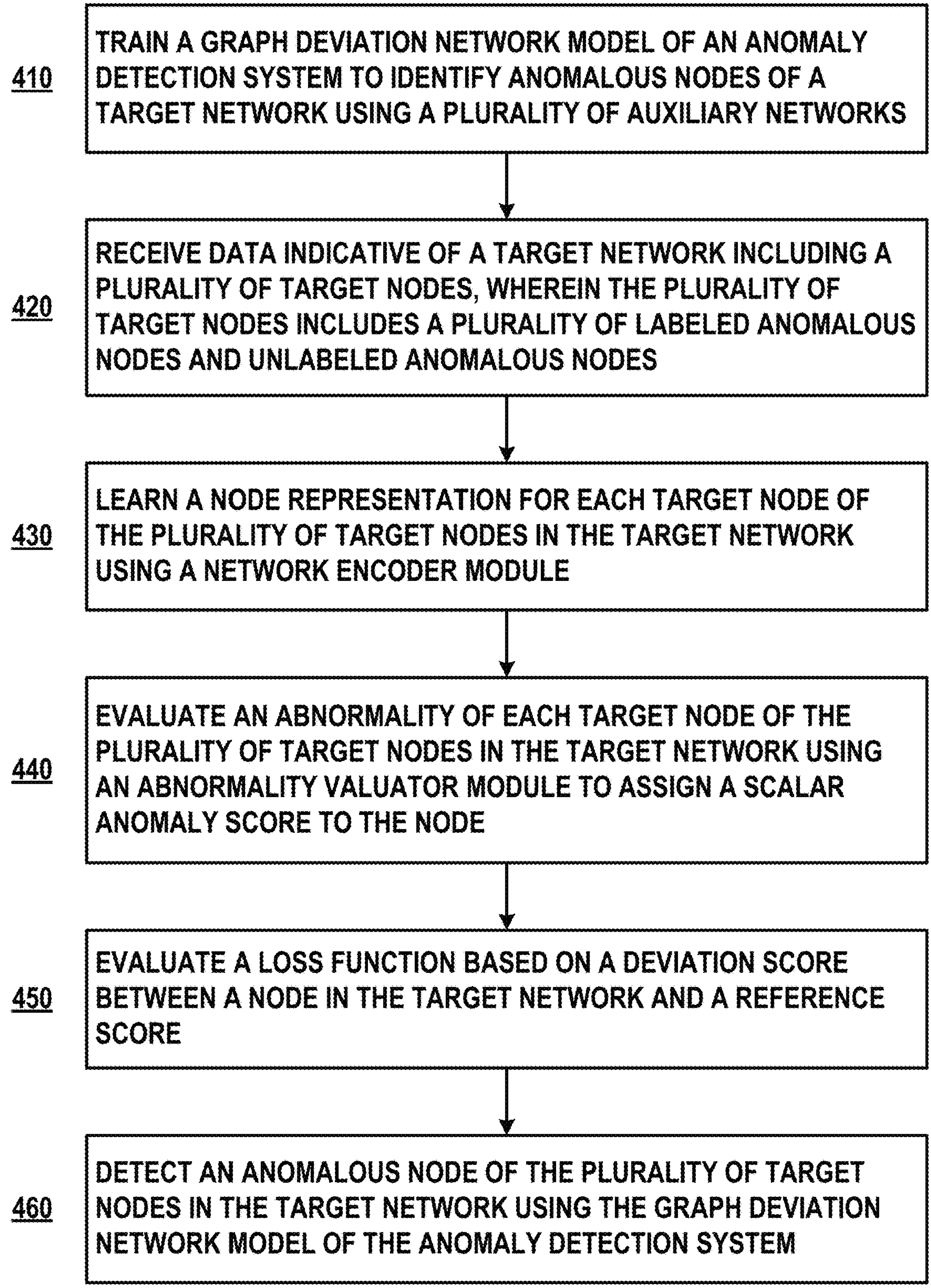

FIGS. 6A and 6B are a pair of process flow diagrams showing a method 400 for anomaly detection by the anomaly detection system 100, including training of the anomaly detection system 100 by the Meta-GDN 300.

As shown in FIG. 6A, block 410 of the method 400 includes training the GDN model of the anomaly detection system 100 to identify anomalous nodes of a target network (e.g., the input network 10) using a plurality of auxiliary networks 30. Block 411 includes sampling, at random, a sample batch of nodes from a plurality of nodes of an auxiliary network of the plurality of auxiliary networks 30. Block 412 includes adapting a plurality of model parameters of the GDN model of the anomaly detection system 100 to the auxiliary network using the sample batch of nodes from the auxiliary network. Block 413 includes fine-tuning the GDN model of the anomaly detection system 100 on the target network including the plurality of target nodes. Block 414 includes sampling, at random, a sample batch of target nodes from a plurality of nodes of the target network. Block 415 adapting a plurality of model parameters of the graph deviation network model to the target network using the sample batch of nodes from the target network.

As shown in FIG. 6B, block 420 includes receiving data indicative of a target network (e.g., the input network 10) including a plurality of target nodes, wherein the plurality of target nodes includes a plurality of labeled anomalous nodes and unlabeled anomalous nodes. Block 430 includes learning a node representation for each target node of the plurality of target nodes in the target network using a network encoder module 110 of the anomaly detection system 100. Block 440 includes evaluating an abnormality of each target node of the plurality of target nodes in the target network using an abnormality valuator module 120 of the anomaly detection system 100 to assign a scalar anomaly score to the node. Block 450 includes evaluating a loss function based on a deviation score between a node in the target network and a reference score. Block 460 includes detecting an anomalous node of the plurality of target nodes in the target network using the graph deviation network model.

Computer-Implemented System

Figure 7:
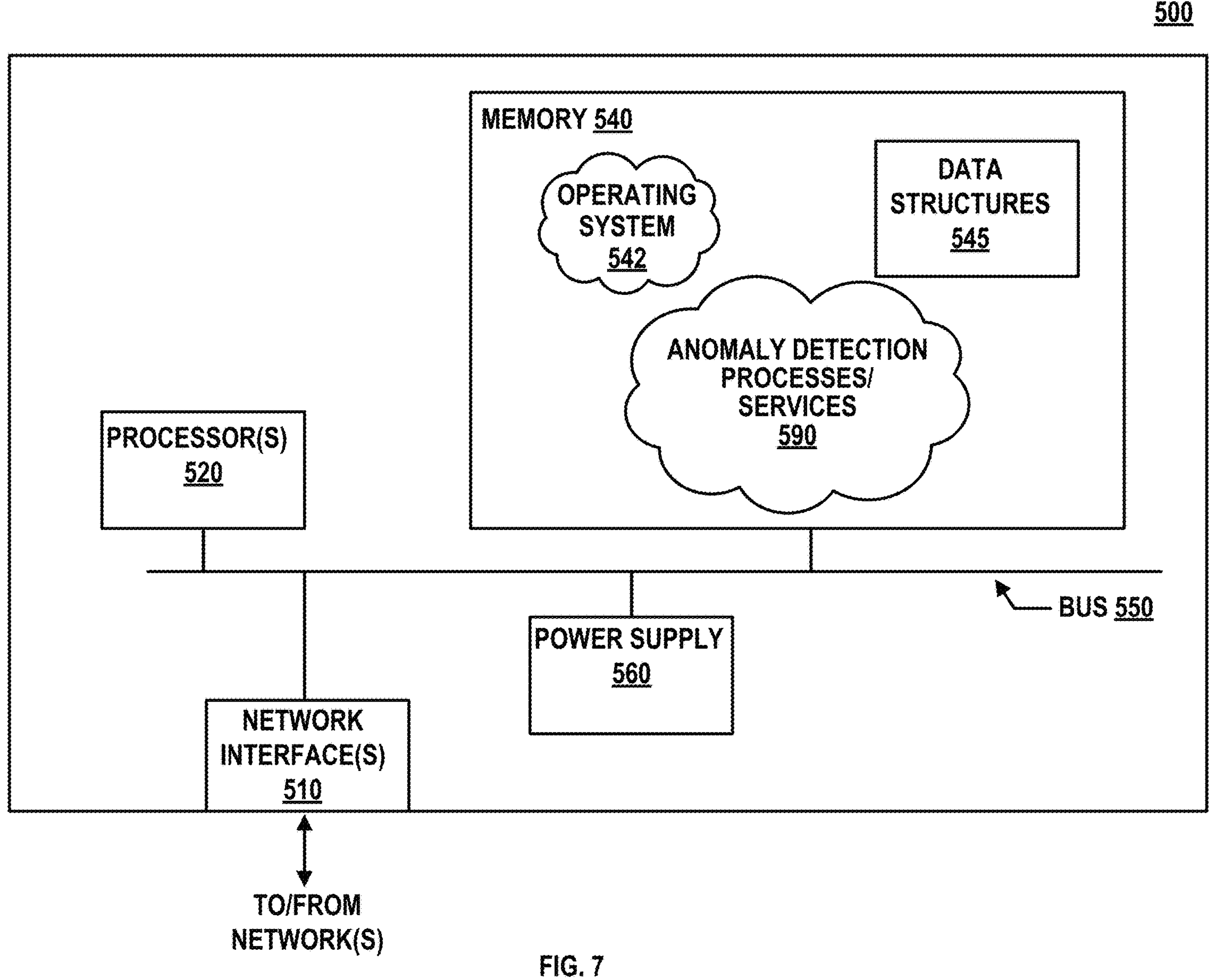
FIG. 7 is an example computing device for implementation of the system of FIGS. 2A and 2B.

FIG. 7 is a schematic block diagram of an example device 500 that may be used with one or more embodiments described herein, e.g., as a component of the system and/or as a computing device.

Device 500 comprises one or more network interfaces 510 (e.g., wired, wireless, PLC, etc.), at least one processor 520, and a memory 540 interconnected by a system bus 550, as well as a power supply 560 (e.g., battery, plug-in, etc.).

Network interface(s) 510 include the mechanical, electrical, and signaling circuitry for communicating data over the communication links coupled to a communication network. Network interfaces 510 are configured to transmit and/or receive data using a variety of different communication protocols. As illustrated, the box representing network interfaces 510 is shown for simplicity, and it is appreciated that such interfaces may represent different types of network connections such as wireless and wired (physical) connections. Network interfaces 510 are shown separately from power supply 560, however it is appreciated that the interfaces that support PLC protocols may communicate through power supply 560 and/or may be an integral component coupled to power supply 560.

Memory 540 includes a plurality of storage locations that are addressable by processor 520 and network interfaces 510 for storing software programs and data structures associated with the embodiments described herein. In some embodiments, device 500 may have limited memory or no memory (e.g., no memory for storage other than for programs/processes operating on the device and associated caches).

Processor 520 includes hardware elements or logic adapted to execute the software programs (e.g., instructions) and manipulate data structures 545. An operating system 542, portions of which are typically resident in memory 540 and executed by the processor, functionally organizes device 500 by, inter alia, invoking operations in support of software processes and/or services executing on the device. These software processes and/or services may include anomaly detection processes/services 590 described herein. Note that while anomaly detection processes/services 590 is illustrated in centralized memory 540, alternative embodiments provide for the process to be operated within the network interfaces 510, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the anomaly detection processes/services 590 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A system, comprising:

a processor in communication with a memory, the memory including instructions, which, when executed, cause the processor to:

provide, at the processor, a graph deviation network model configured to detect an anomalous node of a plurality of target nodes of a target network;

train the graph deviation network model on a plurality of auxiliary networks, including for each auxiliary network of the plurality of auxiliary networks:

sample, at random, a sample batch of nodes from a plurality of nodes of an auxiliary network of the plurality of auxiliary networks; and adapt a plurality of model parameters of the graph deviation network model to the auxiliary network using the sample batch of nodes from the auxiliary network;

determine, using the graph deviation network model, a node representation for each target node of the plurality of target nodes in the target network using a network encoder module;

evaluate, using the graph deviation network model, an abnormality of each target node of the plurality of target nodes in the target network using an abnormality valuator module to assign a scalar anomaly score to each target node;

evaluate, using the graph deviation network model, a loss function based on a deviation score between a node in the target network and a reference score; and detect, using the graph deviation network model, an anomalous node of the plurality of target nodes in the target network using the graph deviation network model.

2. The system of claim 1, wherein the loss function enables the graph deviation network model to assign large anomaly scores to a target node of the plurality of target nodes of the target network using a deviation score of each target node of the plurality of target nodes in the target network, wherein the anomaly scores represent a degree of deviation from non-anomalous nodes of the target node.

3. The system of claim 1, wherein the memory further includes instructions, which, when executed, cause the processor to:

receive data indicative of a target network including a plurality of target nodes, wherein the plurality of target nodes includes a plurality of labeled anomalous nodes and unlabeled anomalous nodes.

4. The system of claim 1, wherein the network encoder module includes at least one graph neural network (GNN) layer configured to determine a node representation for a target node of the target network using an operation:

$$h^l_{\mathcal{N}_i} = \text{AGGREGATE}^l(\{h^{l-1}_j \mid \forall j \in \mathcal{N}_i \cup v_i\}),$$
$$h^l_i = \text{TRANSFORM}^l(h^{l-1}_i, h^l_{\mathcal{N}_i}),$$

where $$h^l_i$$

is a latent representation of node $v_i$ at an l-th layer and wherein $\mathcal{N}_i$ is a set of first-order neighboring nodes of node $v_i$, wherein AGGREGATE(•) is an aggregation function that aggregates messages from neighboring nodes and wherein TRANSFORM(•) computes a new representation of the target node of the target network according to a corresponding previous-layer representation and aggregated messages from one or more neighboring nodes of the target network.

5. The system of claim 1, wherein the abnormality valuator module includes two feed-forward graph neural network (GNN) layers that transform a plurality of intermediate node representations to a corresponding scalar anomaly score for each target node of the target network using:

$$o_i = ReLU(W_s z_i + b_s),$$
$$s_i = u_s^T o_i + b_s,$$

where $s_i$ is an anomaly score of a target node $v_i$ and $o_i$ is an intermediate output, $W_s$ and $u_s$ are a learnable weight matrix and a weight vector, respectively, and $b_s$ and $b_s$ are corresponding bias terms.

6. The system of claim 1, wherein the memory further includes instructions, which, when executed, cause the processor to:

fine-tune the graph deviation network model on the target network including the plurality of target nodes, including:

sample, at random, a sample batch of target nodes from a plurality of nodes of the target network; and adapt a plurality of model parameters of the graph deviation network model to the target network using the sample batch of nodes from the target network.

7. A system, comprising:

a processor in communication with a memory, the memory including instructions, which, when executed, cause the processor to:

train a graph deviation network model on a plurality of auxiliary networks, including for each auxiliary network of the plurality of auxiliary networks:

sample, at random, a sample batch of nodes from a plurality of nodes of an auxiliary network of the plurality of auxiliary networks; and adapt a plurality of model parameters of the graph deviation network model to the auxiliary network using the sample batch of nodes from the auxiliary network; and fine-tune the graph deviation network model on a target network including a plurality of target nodes, including:

sample, at random, a sample batch of target nodes from a plurality of nodes of the target network; and adapt a plurality of model parameters of the graph deviation network model to the target network using the sample batch of nodes from the target network.

8. The system of claim 7, wherein the memory further includes instructions, which, when executed, cause the processor to:

detect an anomalous node of the plurality of target nodes in the target network using the graph deviation network model.

9. The system of claim 8, wherein the memory further includes instructions, which, when executed, cause the processor to:

receive data indicative of a target network including a plurality of target nodes, wherein the plurality of target nodes includes a plurality of labeled anomalous nodes and unlabeled anomalous nodes.

10. The system of claim 7, wherein the memory further includes instructions, which, when executed, cause the processor to:

learn a node representation for the target network using a network encoder module.

11. The system of claim 10, wherein the network encoder module includes at least one graph neural network (GNN) layer configured to determine a node representation for a target node of the target network using:

$$h_{N_i}^l = \text{AGGREGATE}^l(\{h_j^{l-1} | \forall\, j \in N_i \cup v_i\}),$$

$$h_i^l = \text{TRANSFORM}^l(h_i^{l-1}, h_{N_i}^l),$$

where $$h_i^l$$

is a latent representation of target node $v_i$ at an l-th layer and wherein $\mathcal{N}_i$ is a set of first-order neighboring nodes of target node $v_i$, wherein AGGREGATE(•) is an aggregation function that aggregates messages from neighboring nodes and wherein TRANSFORM(•) computes a new representation of a target node of the target network according to a corresponding previous-layer representation and aggregated messages from one or more neighboring target nodes.

12. The system of claim 7, wherein the memory further includes instructions, which, when executed, cause the processor to:

evaluate an abnormality of each target node in the target network using an abnormality valuator module to assign a scalar anomaly score to the target node.

13. The system of claim 12, wherein the abnormality valuator module includes two feed-forward graph neural network (GNN) layers that transform a plurality of intermediate node representations to a corresponding scalar anomaly score for each target node in the target network:

$$o_i = ReLU(W_s z_i + b_s),$$

$$s_i = u_s^T o_i + b_s,$$

where $s_i$ is an anomaly score of node $v_i$ and $o_i$ is an intermediate output, $W_s$ and $u_s$ are a learnable weight matrix and a weight vector, respectively, and $b_s$ and $b_s$ are corresponding bias terms.

14. The system of claim 7, wherein the memory further includes instructions, which, when executed, cause the processor to:

evaluate a deviation between a node in the target network and a reference score; and implement a loss function that enables the graph deviation network model to assign anomaly scores to one or more nodes, wherein the anomaly scores represent a degree of deviation from non-anomalous nodes of the target node.

15. The system of claim 7, wherein the sample batch of nodes for each auxiliary network of the plurality of auxiliary networks includes a first plurality of nodes and a second plurality of nodes, wherein the first plurality of nodes are unlabeled and wherein the second plurality of nodes are labeled anomalous nodes.

16. The system of claim 7, wherein the sample batch of target nodes for the target network includes a first plurality of nodes and a second plurality of nodes, wherein the first plurality of nodes are unlabeled and wherein the second plurality of nodes are labeled anomalous nodes.

17. The system of claim 7, wherein each auxiliary network of the plurality of auxiliary networks includes a unique plurality of nodes.

18. A method, comprising:

providing, at a processor, a graph deviation network model configured to detect an anomalous node of a plurality of target nodes of a target network;

training, at the processor, the graph deviation network model on a plurality of auxiliary networks, including for each auxiliary network of the plurality of auxiliary networks:

sampling, at random, a sample batch of nodes from a plurality of nodes of an auxiliary network of the plurality of auxiliary networks; and adapting a plurality of model parameters of the graph deviation network model to the auxiliary network using the sample batch of nodes from the auxiliary network;

learning, at the processor, a node representation for each target node of the plurality of target nodes in the target network using a network encoder module;

evaluating, at the processor, an abnormality of each target node of the plurality of target nodes in the target network using an abnormality valuator module to assign a scalar anomaly score to the node;

evaluating, at the processor, a loss function based on a deviation score between a node in the target network and a reference score; and detecting, at the processor, an anomalous node of the plurality of target nodes in the target network using the graph deviation network model.

19. The method of claim 18, further comprising:

fine-tuning the graph deviation network model on the target network including the plurality of target nodes, including:

sampling, at random, a sample batch of target nodes from a plurality of nodes of the target network; and adapting a plurality of model parameters of the graph deviation network model to the target network using the sample batch of nodes from the target network.

* * * * *